United States Patent [19]
Pawloski

[11] Patent Number: 5,313,618
[45] Date of Patent: May 17, 1994

[54] SHARED BUS IN-CIRCUIT EMULATOR SYSTEM AND METHOD

[75] Inventor: Martin B. Pawloski, Scottsdale, Ariz.

[73] Assignee: Metalink Corp., Chandler, Ariz.

[21] Appl. No.: 939,678

[22] Filed: Sep. 3, 1992

[51] Int. Cl.$^5$ ............................ G06F 11/00; G01R 31/28
[52] U.S. Cl. .................................... 395/500; 371/16.2; 364/DIG. 1; 364/DIG. 2
[58] Field of Search ........................... 371/16.2, 16.1; 395/500, 800; 364/578

[56] References Cited
U.S. PATENT DOCUMENTS

| | | | |
|---|---|---|---|
| 4,569,048 | 3/1986 | Sargent | 371/16 |
| 4,674,089 | 6/1987 | Poret et al. | 395/500 |
| 4,677,586 | 6/1987 | Magar et al. | 395/575 |
| 4,785,416 | 11/1988 | Stringer | 395/500 |
| 4,809,167 | 3/1989 | Pawloski et al. | 295/500 |
| 4,847,805 | 7/1989 | Ishil et al. | 371/16.2 |
| 4,868,822 | 9/1989 | Scott et al. | 371/16 |
| 4,901,259 | 2/1990 | Watkins | 364/578 |
| 4,939,637 | 6/1990 | Pawloski | 395/500 |
| 4,989,207 | 1/1991 | Polstra | 371/16.2 |
| 5,048,019 | 9/1991 | Albertsen | 371/16.2 |
| 5,056,013 | 10/1991 | Yamamoto | 371/16.2 |
| 5,132,971 | 7/1992 | Oguma et al. | 371/16.2 |

Primary Examiner—Robert B. Harrell
Assistant Examiner—Timothy L. Philipp
Attorney, Agent, or Firm—Raymond J. Werner

[57] ABSTRACT

An in-circuit emulator, alternatively referred to as a microcontroller debugging system, has a control processor having I/O ports and a multiplexed address/data bus port, an emulation processor having I/O ports and a multiplexed address/data bus port, an emulation memory having address inputs, a data bus interface and a plurality of two-to-one multiplexers. The in-circuit emulator is configured such that the control processor and the emulation processor each have at least one port directly coupled to the data bus of the emulation memory without the use of external tri-state buffers, this is referred to as the shared bus. An address latch, shared by both processors, has its inputs coupled to the shared bus. The outputs of the address latch form a portion of the emulation memory address input, and are coupled to a corresponding portion of the emulation memory address inputs. The emulation processor is supplied with a clock which is selected from the group consisting of: the same clock input signal used by the control processor, a clock synchronized with the internal clock of the control processor and a clock which is asynchronous with respect to the internal clock of the control processor.

31 Claims, 27 Drawing Sheets

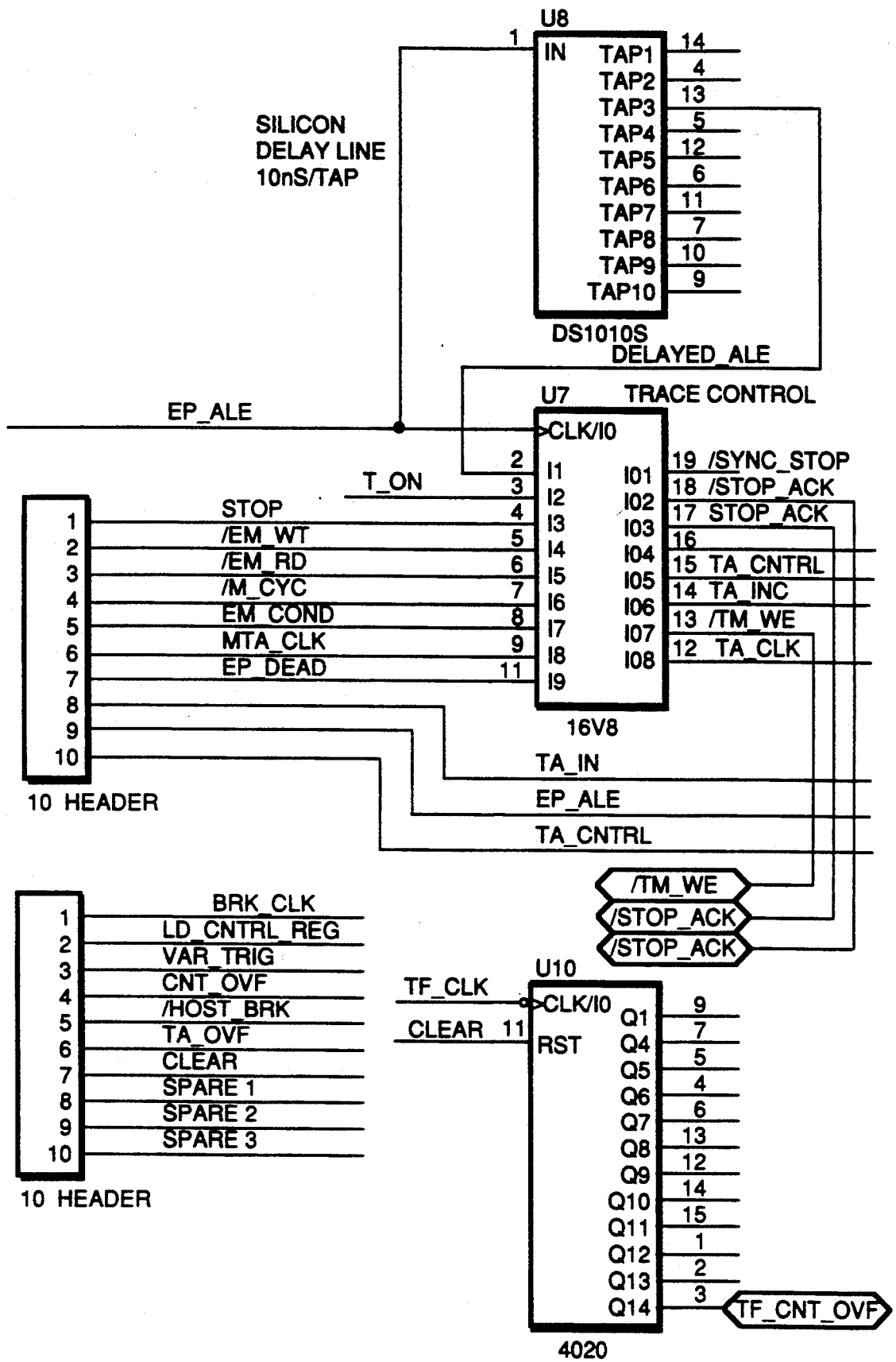
Fig. 7a  TRACE TRIGGER COUNTER

SHARED BUS IN-CIRCUIT EMULATOR SYSTEM AND METHOD

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to an architecture, system and method for in-circuit emulation. More particularly, the present invention relates to an architecture and system for performing in-circuit emulation of microcontrollers and microprocessors having a bus shared by at least two data processing elements and a method of performing in-circuit emulation using a bus shared by at least two data processing elements.

2. Related Art

Soon after the development of the microprocessor, semiconductor process technology advanced to the point where it became possible to integrate enough Read Only Memory (ROM) and Random Access Memory (RAM) on a single chip along with a Central Processing Unit (CPU) to make a useful single-chip microcomputer. These single-chip microcomputers are often referred to as microcontrollers. Typically, a microcontroller includes a ROM for storing one or more software programs, RAM for storage of variables used by the program(s) during operation, a CPU for performing various arithmetic and logical functions and a plurality of Input/Output (I/O) lines. These I/O lines are often viewed in groups of eight and the groups are referred to collectively as I/O ports, or simply ports. Sometimes individual I/O lines are referred to as port pins. Microcontrollers also often include peripheral functions such as timers, counters, serial or parallel communication channels, A/D converters, and D/A converters. Representative examples of microcontrollers described above are the well-known 68HC11 (manufactured by Motorola Corp.) and the 8051 family of microcontrollers (manufactured by Intel Corporation of Santa Clara, Calif., Signetics Corporation of Sunnyvale, Calif., and others). As a particular example, the 8052 microcontroller, a member of the 8051 microcontroller family, includes in addition to a CPU, a 256 byte RAM, an 8192 byte ROM, an interrupt controller, a full duplex Universal Asynchronous Receiver/Transmitter (UART), three 16 bit timer/counters, and four 8 bit general purpose I/O ports. FIG. 3 is a block diagram showing the architecture of the 8051.

The unit volume of microcontrollers used each year has generally been increasing over the years since these devices were first introduced. Not only has the unit volume been increasing, but the number of systems, i.e., applications, into which these devices have been designed has also been increasing.

One problem that arises in using these single-chip microcontrollers has to do with debugging systems incorporating these devices. Remembering that the program memory and variable memory are integrated onto the single-chip microcontroller, people skilled in the art will appreciate that access to the internal address and data buses of the microcontroller, which is useful in debugging a new design, is limited by the fact that these signals are not generally accessible outside the chip.

In-circuit emulators (hereafter "emulators") are tools for use in designing systems incorporating microcontrollers. These emulators enable system designers and programmers to determine whether their software is operating as intended. Further, these emulators make it relatively easy to debug software programs. Using these tools, system designers, engineers, programmers and technicians can interactively control and examine the state of the system at any chosen time, as well as control the execution of programs under development. This is essential for reducing the time required for debugging a system design which includes a microcontroller.

Typically, an emulator is a separate hardware/software product that emulates the microcontroller in a target system. The emulator is electrically coupled to a target system by means of a cable and connector that connects to the target system in the same manner that the microcontroller would connect to the target system. The emulator can execute program code stored in the memory of the target system, as well as code which has been stored in its own memory areas. An emulator provides not only the capabilities of the target processor, but a set of debugging capabilities to facilitate and shorten the debugging process. Emulators provide read/write access to all signals and all data to which the microcontroller has access, including information which resides inside the microcontroller. Access to this information enables engineers to effectively control and debug a microcontroller application. Design aspects of an in-circuit emulator for an 8051 type microcontroller manufactured by Metalink Corp. of Chandler, Ariz., are discussed in U.S. Pat. No. 4,939,637 and that patent is hereby incorporated herein, in its entirety, by reference.

One use of an emulator is in software development. The emulator executes the program exactly as the target system would, in real time, and it provides a wide variety of interactive debugging capabilities and facilities. Therefore, software developed using the emulator can be completely debugged, except for the hardware interface, before it is integrated with the system hardware.

A second use of an emulator is in the integration of the target system software and hardware. Even when the target system hardware and software have been individually (i.e., separately) debugged, new problems can, and often do, surface when the target system software and hardware are joined together. In this case the emulator serves to facilitate debugging of the hardware-software combination. Furthermore, after a prototype has been debugged, the emulator can be used to test the compliance of the new hardware-software combination with the design specification. Worst case parametric tests can be developed and tested on the prototype. This provides the designer with valuable information about the limitations of the system. It also provides the capability for test programs which can be used in the manufacturing process.

A third use of an emulator is in product-manufacturing. The same test routines used to develop and debug the prototype, or even more comprehensive test routines, can be used to test the finished products. Nonfunctioning units can be easily debugged using the debugging capability of the emulator.

A fourth use of an emulator is in field service. Rapid debugging of a product that has failed in the field is a valuable service that can be provided to customers.

Additionally, the growing trend of concurrent engineering, wherein all phases of product development, e.g., electrical design, mechanical design, test, and manufacturing are carried out simultaneously, requires substantially all members of a product development team to have access to development tools.

FIG. 1 shows the internal datapath of a conventional 8051 family in-circuit emulator, designated by general reference numeral 100, designed with two microcontrollers, a control processor 102 for control and interface purposes and an emulation processor 104 for actually executing the target program. Control processor 102, and emulation processor 104 have multiplexed address/data buses and each needs to access an emulation memory 106. (Members of the 8051 family of microcontrollers, PORT0 and PORT2 are active in fetching external instructions and data.) Emulation memory 106 is coupled to an address bus 108 and a data bus 110. In order to achieve a complete 16-bit address for read/write access to emulation memory 106, control processor 102 stores the low-order byte of an address into address latch 112. PORT0 of control processor 102 is coupled onto the inputs of address latch 112 via a tri-state buffer 116. The output of address latch 112 is coupled onto a first portion of address bus 108. PORT0 of control processor 102 is connected to the inputs of tri-state buffer 116 the outputs of which are in turn connected to data bus 110. A tri-state buffer 118 selectively couples the output of PORT2 of control processor 102 onto a second portion of address bus 108. Data read from emulation memory 106 is returned to PORT0 of control processor 102 via tri-state buffer 120 which has its inputs connected to data bus 110 and its outputs connected to PORT0 of control processor 102. Similarly, in order to achieve a complete 16-bit address for read/write access to emulation memory 106 emulation processor 104 stores the low-order byte of an address into address latch 112. PORT0 of emulation processor 104 is connected to the inputs of a tri-state buffer 126, the outputs of which are in turn connected to data bus 110. A tri-state buffer 130 selectively couples the output of PORT2 of emulation processor 104 onto a second portion of address bus 108. Data read from emulation memory 106 is returned to PORT0 of emulation processor 104 via tri-state buffer 128 which has its inputs connected to data bus 110 and its outputs connected to PORT0 of emulation processor 104.

FIG. 1 also shows a wait memory 140 having an output coupled to PORT0 of emulation processor 104 via a tri-state buffer 142. Monitor RAM 150 and monitor ROM 152 are both coupled onto emulation data bus 110 via tri-state buffer 154 and then coupled onto PORT0 of emulation processor 104 via tri-state buffer 128. Address bus 108 is coupled directly to Monitor RAM 150 and Monitor ROM 152.

FIG. 1 also shows an address latch 160 having inputs coupled PORT0 of control processor 102, and having outputs coupled to a first portion of the address inputs of a control processor firmware memory 162. Control processor firmware memory 162 has a second portion of address inputs coupled to PORT2 of control processor 102, and a data bus port coupled to PORT0 of control processor 102.

As shown in FIG. 1, use of the dual processor architecture with the multiplexed address/data buses forces the use of a number of tri-state buffers with their associated control, and corresponding interconnect, as well as separate memories to achieve functions such as waiting.

So, microcontroller use has been increasing not just in volume but in the number applications being designed. In-circuit emulators are a necessary tool for achieving both a high level of confidence in a design and a short time-to-market.

In view of the many uses of an emulator, the growing popularity of concurrent engineering, and the large number of embedded microcontroller applications existing and being developed, it can be seen that there is a need for a large number of emulator systems in this field. Therefore there is a corresponding need to reduce the cost, size, and power consumption of emulators, while simultaneously increasing their reliability. Such goals are desirable to achieve commercial success in this market.

SUMMARY OF THE INVENTION

It is an object of the present invention to provide a reduced parts count in-circuit emulator having substantially all of the features of conventional in-circuit emulators.

It is a further object of the present invention to permit the emulation processor to be synchronized to the target system while in emulation mode and yet be synchronized to the control processor for a portion of the break mode period.

It is a further object to use the emulation processor as the memory address generator for all control processor accesses of the emulation memories by using the instruction fed to the emulation processor by the control processor to manipulate the address that the emulation processor outputs.

It is a further object of the present invention to use the quasi-bidirectional port structure of the 8051 microcontroller family to create a wire-ORed data bus structure between the control processor, the emulation processor and the emulation memory.

It is a further object to use the quasi-bidirectional port structure of the 8051 microcontroller family to create a wire-ORed memory control line structure between the control processor, the emulator control logic and the emulation memory.

It is a further object to allow the control processor to input the clock to the emulation processor so that the control processor can monitor all the bus states of the emulation processor.

It is a further object to replace the emulation processor routines that normally reside in any of the miscellaneous memories (e.g., the Monitor ROM) of a conventional emulator, with a stream of instructions fed to the emulation processor by the control processor.

It is a further object to minimize the interconnect and control structure of the address bus by using only one address source for the emulation and attribute memories.

It is a further object to have the control processor use the low byte of the address that is output by the emulation processor onto the wire-ORed data bus during the address phase of the bus cycle for synchronizing to the instruction stream of the emulation processor.

It is a further object to have the control processor use the low byte of the address that is output by the emulation processor onto the wire-ORed data bus during the address phase of the bus cycle in order to access internal states of the emulation processor without using any write cycles.

Briefly, the present invention provides a shared bus architecture wherein both a control microprocessor and an emulation microprocessor are directly coupled to an emulation memory via a data bus. Further, both the control microprocessor and the emulation microprocessor are directly coupled to an address latch via the same data bus. The single address latch, shared by both of the microcontrollers in the dual processor arrangement of the present invention, provides the low-order address bits to the emulation memory address bus. The emulation processor is supplied with a clock which is selected from the group consisting of: the same clock input signal used by the control processor, a clock synchronized with the internal clock of the control processor and a clock which is asynchronous with respect to the internal clock of the control processor, i.e., the target system clock. The synchronization capability of the dual processor arrangement of the present invention allows the control processor to precisely control the bus cycle state of the emulation processor. More particularly, the control processor, by controlling the clock input to the emulation processor, is able to monitor the bus state of the emulation processor by monitoring the activity of the emulation processor control signal outputs. By monitoring the emulation processor in this way, the control processor is able to determine the precise bus cycle of the emulation processor, and thereby achieve a high-level synchronization as well as clock synchronization.

An advantage of the architecture of the present invention is a reduction in the number of components, such as separate memories and tri-state buffers, needed to implement emulator functionality. This reduced parts count in turn provides for the desirable characteristics of lower power consumption, lower cost of manufacture and operation, lower weight, smaller size, and higher reliability.

A further advantage of the present invention is that the reduction of components reduces the power supply requirements to the extent that a battery-powered emulator can be provided for field service engineers and technicians.

A still further advantage is that physical size and power consumption are reduced to such an extent that the entire emulator can be mounted in the target system, thus eliminating the cable previously used to connect the emulator to the target system, and once mounted in the target system, operated from the target system power supply, thus eliminating a power supply and a power cord.

A still further advantage of the emulator of the present invention is that it is operable to receive other members of a family of microcontrollers and thus can support emulation of many family members without any hardware changes other than swapping emulation processors in and out.

A still further advantage is that elimination of buffers in the datapath, according to the present invention, allows slower and less expensive memory chips to be used.

A still further advantage is that elimination of buffers in the datapath, according to the present invention, allows shorter cycle times to be achieved, thus permitting emulation processors to be run at full speed.

A still further advantage of the present invention is having the emulation processor selectively synchronized to either the target system or the control processor.

A still further advantage is that the size and weight reduction provided by the present invention results in significantly lower shipping costs for the emulator manufacturer.

A still further advantage of the present invention is that its reduced parts count provides a corresponding reduction in the emulator manufacturer's costs associated with inventory.

Other objects and advantages together with a fuller understanding of the invention will become apparent and appreciated by referring to the following description and claims taken in conjunction with the accompanying drawings.

BRIEF DESCRIPTION OF THE DRAWINGS

FIGS. 7a-7e are illustrative circuit schematics showing the relationship between the shared data bus and the trace memory.

DETAILED DESCRIPTION OF THE INVENTION

Terminology

Figure 1:
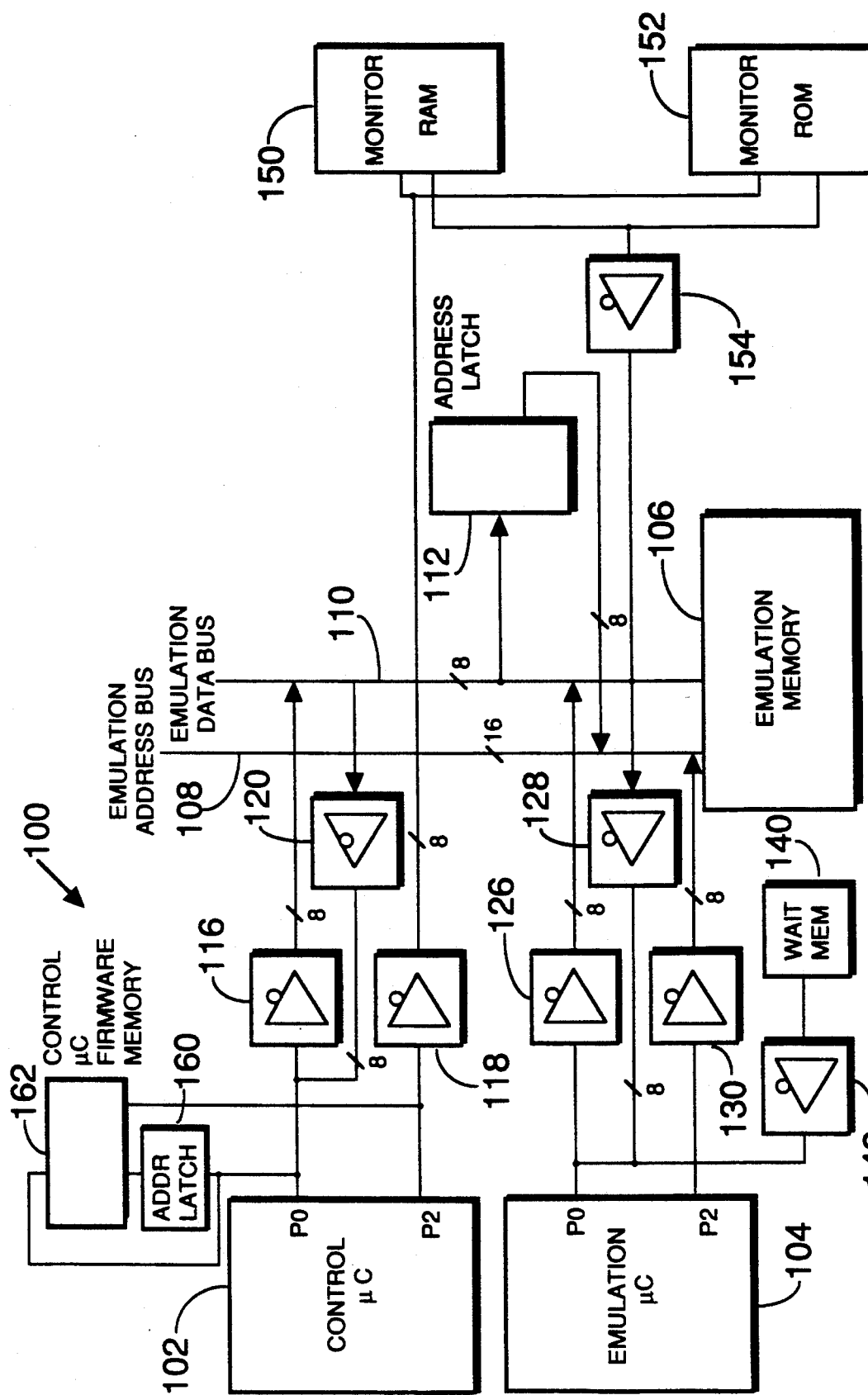
FIG. 1 is a high-level block diagram of a portion of a conventional in-circuit emulator system showing the relationship between the emulation memory and the control and emulation microprocessors.

This section is intended to clarify language use by providing alternative terms for some of the expressions used herein, where such alternative terms are known to exist. The lists of alternative terms and expressions are not necessarily exhaustive, nor are they intended to be interpreted as limiting the scope of the invention, or range of equivalents in any way.

The terms chip, semiconductor device, integrated circuit, monolithic integrated circuit, microelectronic device, and similar variants are used interchangeably herein, and microelectronic device is considered to be the broadest term, encompassing the others. With respect to these microelectronic devices, signals are coupled between them and other circuit elements via physical, electrically conductive connections. The point of connection is sometimes referred to as an input, output, terminal, line, pin, pad, port, interface, or similar variants and combinations. These are considered equivalent terms for the purpose of this disclosure.

The terms single-chip microcomputer, microcontroller, embedded controller, embedded processor and similar variants are often used interchangeably in this field and are generally meant to include single-chip digital data processing devices such as those exemplified by the 8051 family of microcontrollers. More particularly, and depending on context, the term 8051 can be used either to refer to the whole family of microcontrollers that execute the well-known 8051 instruction set, regardless of manufacturer, memory size, number and type of peripheral functions, or the size and form of package; or it can be used specifically for a particular instance of the 8051 family. The term 8051 is used herein to refer to all family members that execute the 8051 instruction set.

A computer, whether a large or small system, or a microprocessor or microcontroller is often referred to in this field as a machine. For example, the "state of the machine" generally refers to the logical state of the computer as manifested by the state of substantially all the storage bits therein. Additionally, both complete computer systems and CPUs are sometimes referred to broadly as programmed data processors. The term, programmed data processor, is used herein to encompass all manner of computing, or data processing, elements such as microprocessors, microcomputers, and any functionally equivalent device or system.

The terms emulator, in-circuit emulator, and microcontroller development system are used interchangeably herein. Also, the term emulation processor is intended to be broad and includes the specific terms emulation microcontroller, emulation microprocessor, emulation engine, and similar variants. It should be noted that in-circuit emulators can be made for general purpose microprocessors as well as microcontrollers.

The terms emulation processor and target processor are used synonymously herein. These terms refer to the actual microcontroller device used in the emulator to execute the software of the application, i.e., target system. Control and master are used to refer to the microcontroller within the emulator which is in communication with the host computer, and which does not execute target code.

Overview

The emulator is an integral part of the development engineer's toolbox, applicable to application software development, hardware integration, manufacturing test, and field service.

The emulator of the present invention is an in-circuit emulator controlled by a host computer, which in particular is an IBM PC, or compatible, running the PC-DOS/MS-DOS operating system. The function of the host computer is to provide a communication and control pathway between the user and the emulator. In other words, the host computer is used for such things as user input via a keyboard, or downloading software to the emulator from the host, and display of emulator output via the printer, disk, or video terminal of the host computer. Those of ordinary skill in the art will recognize that any host computer capable of such functions can be used in conjunction with the emulator of the present invention.

The emulator of the present invention can be operated in a target system in place of a microcontroller, or it can be operated independently in a stand-alone mode. Stand-alone mode allows the emulation of hardware, and/or the execution of program code without a target system (as long as no interaction with external devices is required).

Hardware designers may use the emulator to develop and debug their designs. All available features of a given microcontroller chip are accessible interactively, as well as through the user's programs. Software designers have complete emulation capability as well. The emulator executes program code in the same manner as the microcontroller being emulated because it incorporates the actual microcontroller being emulated. For example, if an 8051 family chip is being emulated, then an 8051 family microcontroller chip is incorporated into the emulator. However, if an MC68HC11 is to be emulated then an MC68HC11 is actually incorporated into the emulator.

The emulator itself is a dual processor system having an emulation processor (alternatively referred to as a target processor) and a control processor (alternatively referred to as a master processor). The emulation processor generally is never halted (except during a hard reset) as smooth transitions from emulation mode to break mode and back without the loss of data, registers, interrupts and the like (i.e., the internal state of the machine) are a critical part of the emulator design. Much of the information of interest to a person using the emulator is internal to the emulation processor, and therefore the emulation processor must be kept running while some form of communication with the control processor is supported. This communication allows the exchange of data as well as coordination of transition from state to state. The control processor is used in controlling the operation of the emulator, and, in the preferred embodiment of the present invention, it is in communication with the user via an RS232 serial link.

Those of skill in this field will recognize that any other serial or parallel communication link between the host computer and control processor could be substituted for the RS232 serial link. Those skilled in the art will recognize that the choice of serial link versus a parallel link is a matter of design choice based on well-understood trade-offs, and that the present invention contemplates all manner of communication between the emulator and the host, for example, serial or parallel; electrical, mechanical, or optical; or digital or analog. For example an infrared transmitter/receiver may be installed in both the host computer and the emulator in order that commands and data be communicated between them. Infrared communication devices are commonly available in such everyday items as remote controllers for televisions, video cassette recorders (VCRs) and stereos. Alternatively, the emulator may be equipped with a modem so that the host computer may be located at a remote site and still communicate with the emulator. This type of emulator-to-host communication scheme is useful for field service applications. Also, radio frequency transmitters and receivers may be installed in both the emulator and the host computer in order to provide a communications link between them. A fiber optic link between the host computer and the emulator, either serial or parallel, is also contemplated as a communication link by the present invention. FIGS. 9A-9F illustrate various communication schemes.

The control processor does very little in maintaining information about the emulator configuration. In the presently preferred embodiment, most of the configuration information is stored by the host computer and transferred to the emulator in the form of commands and data over the serial link.

Figure 2:
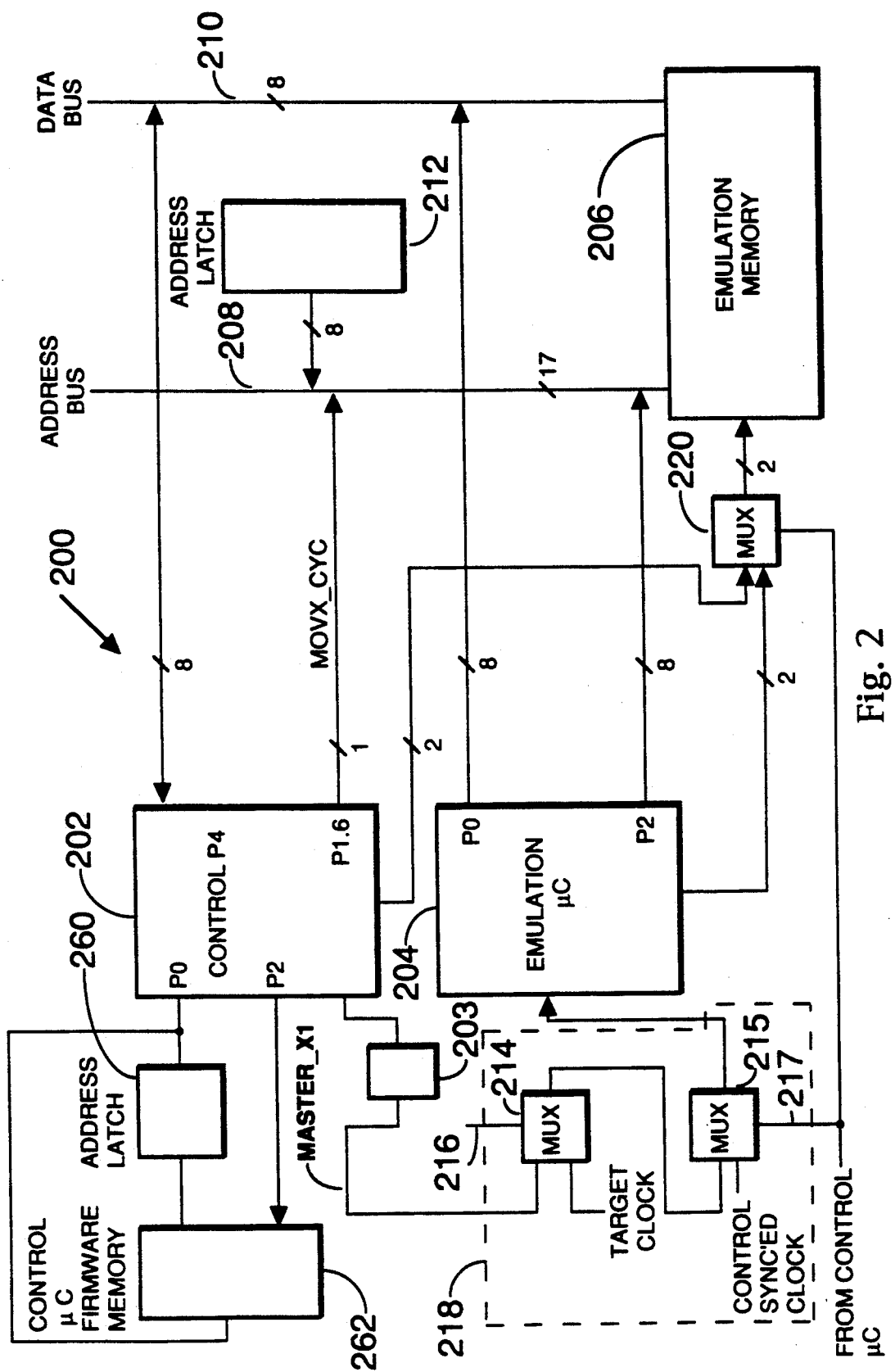
FIG. 2 is a high-level block diagram of a portion of the in-circuit emulator system according to the present invention showing the relationship between the emulation memory and the control and emulation microprocessors.
Figure 3:
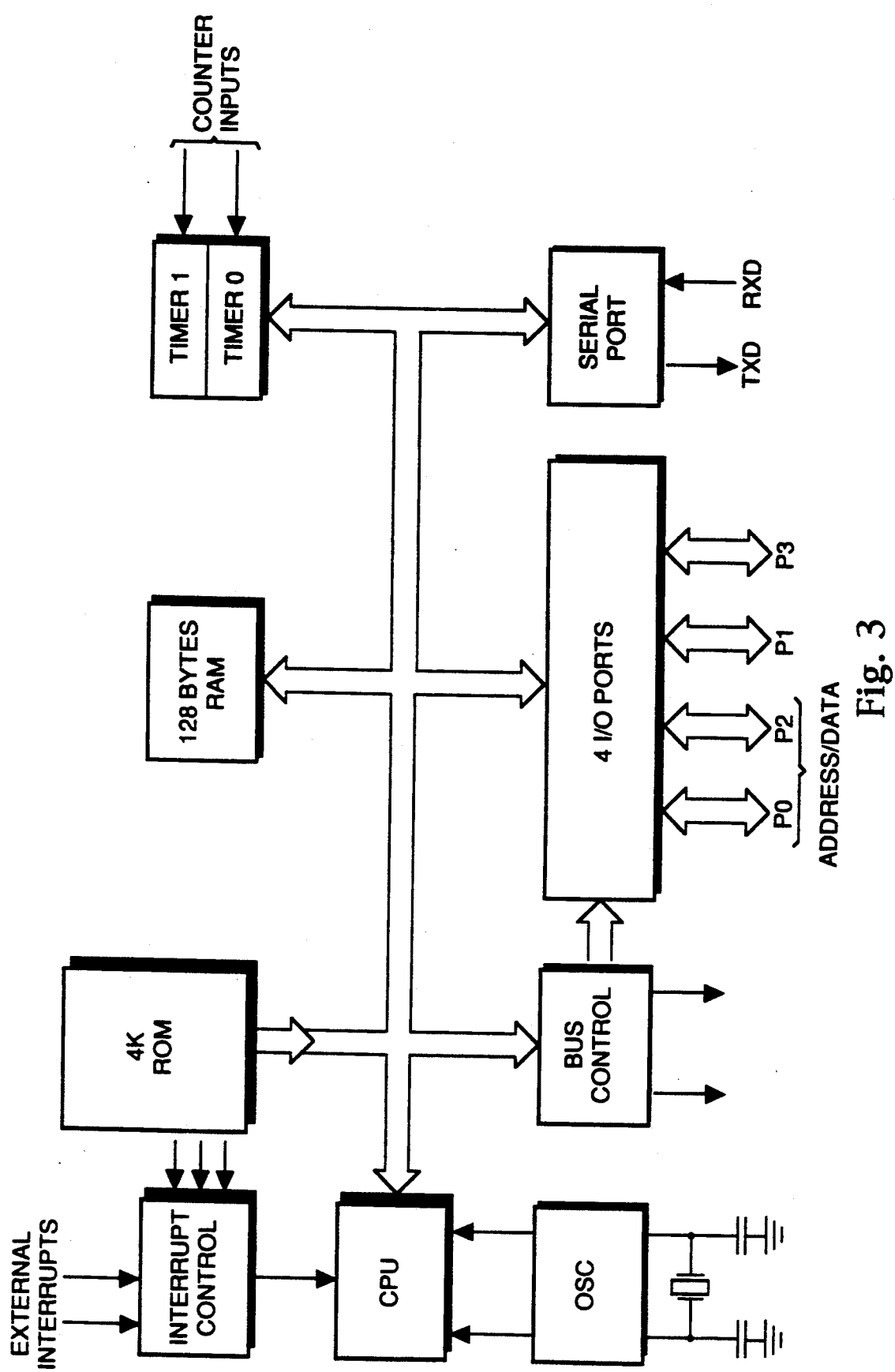
FIG. 3 is a block diagram illustrating the internal datapath architecture of an 8051 microcontroller device.
Figure 4A:
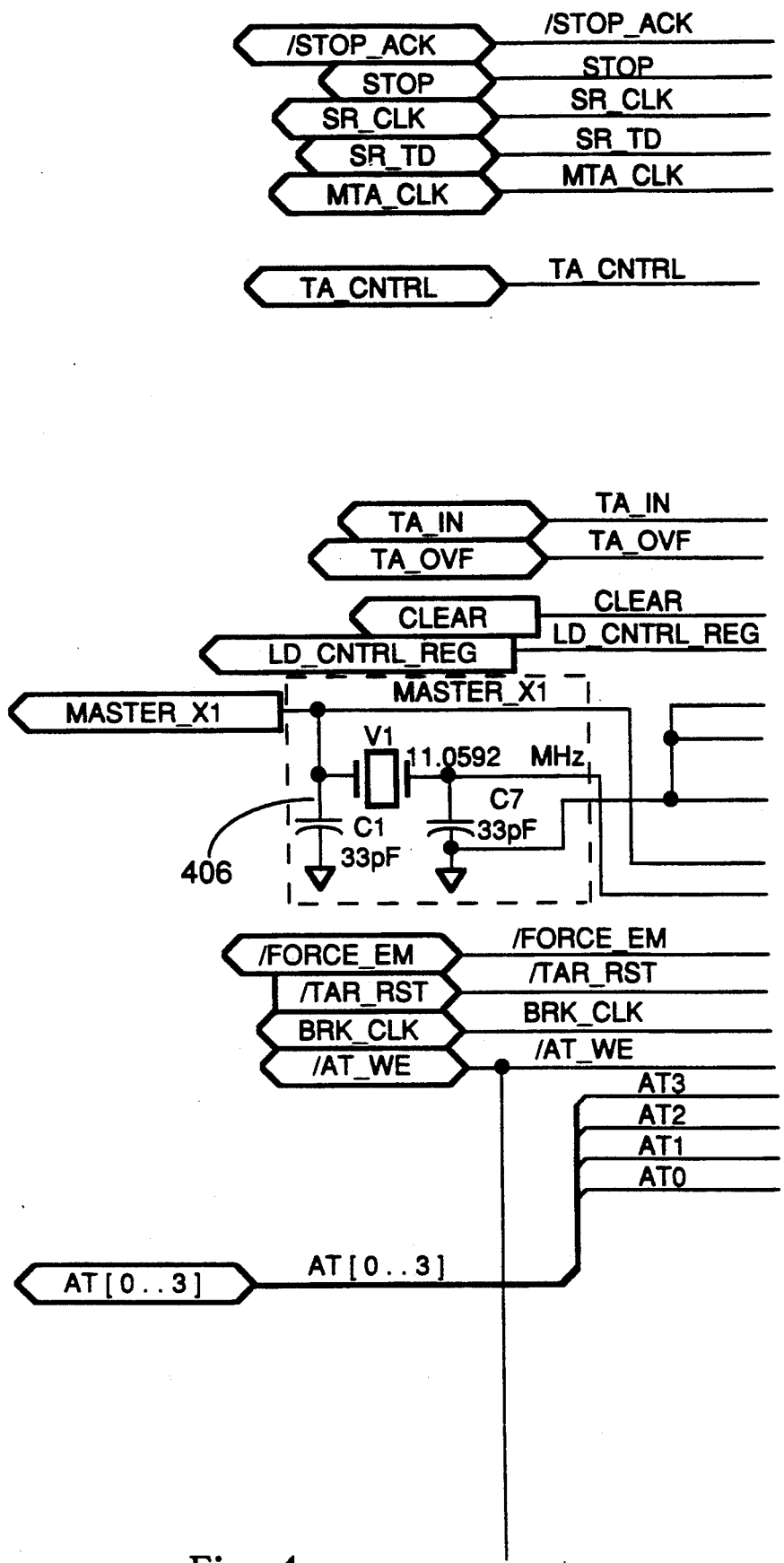
FIGS. 4a-4f are illustrative circuit schematics showing the control processor of the present invention.
Figure 4B:
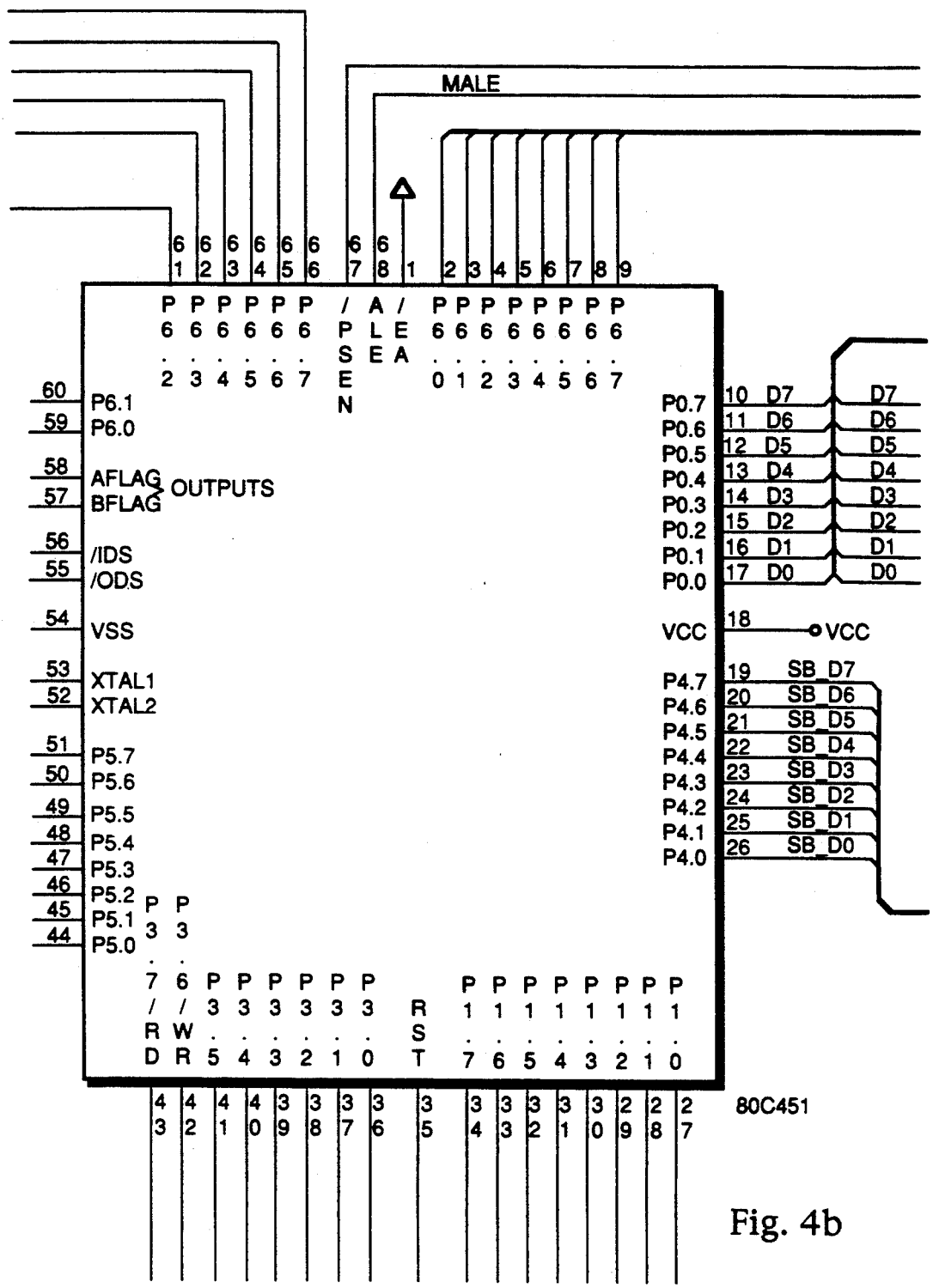
Figure 4C:
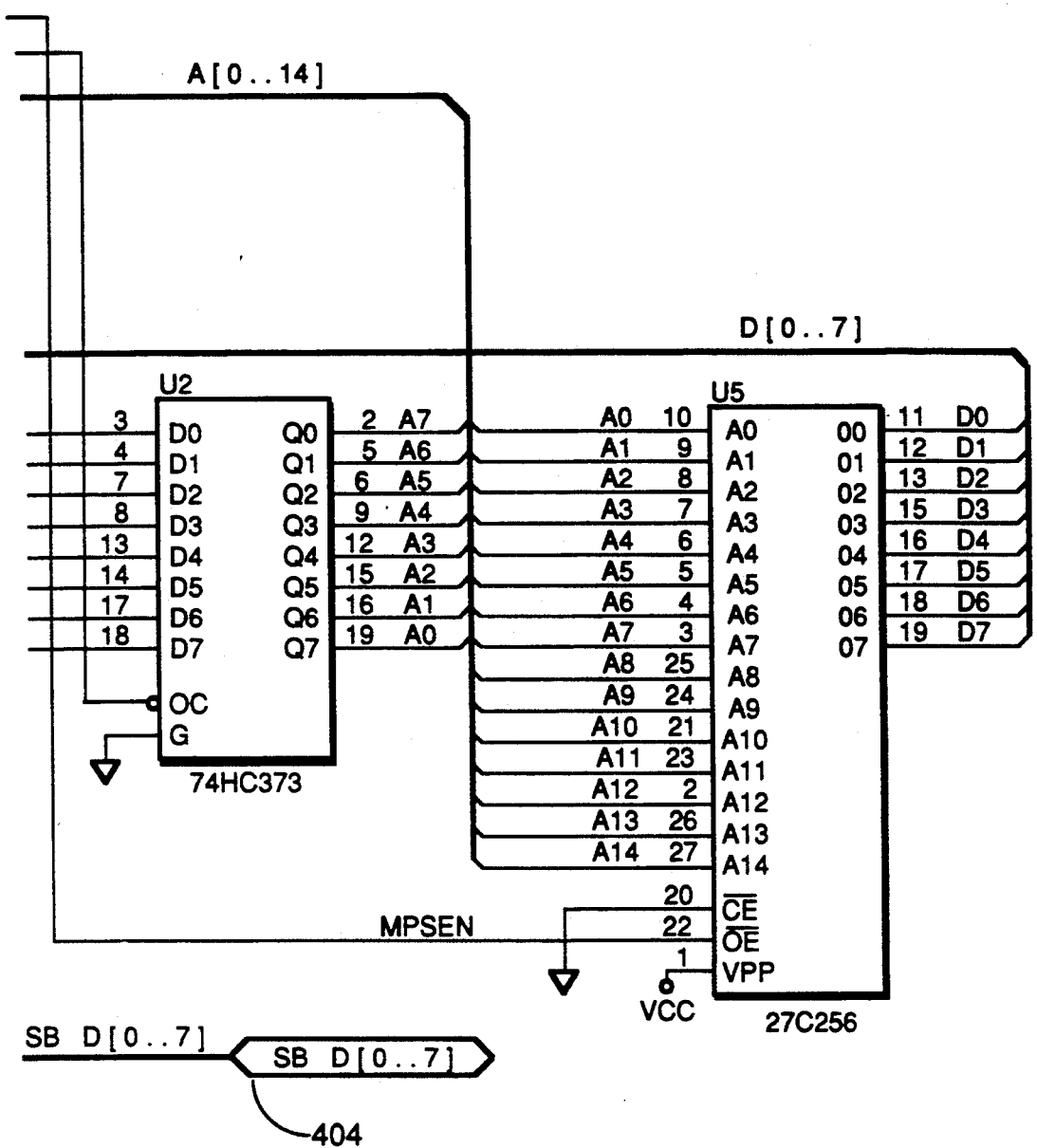
Figure 4D:
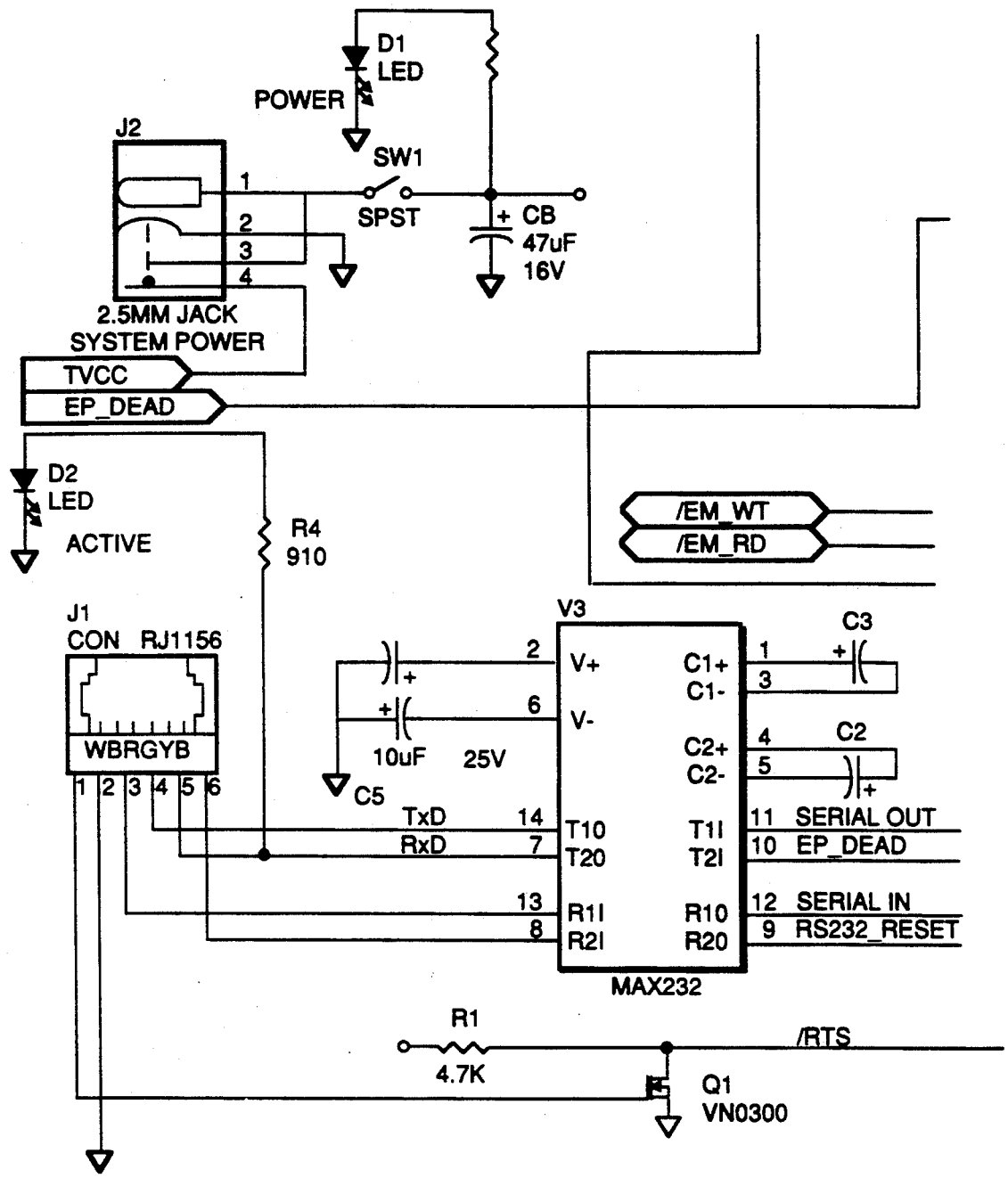
Figure 4E:
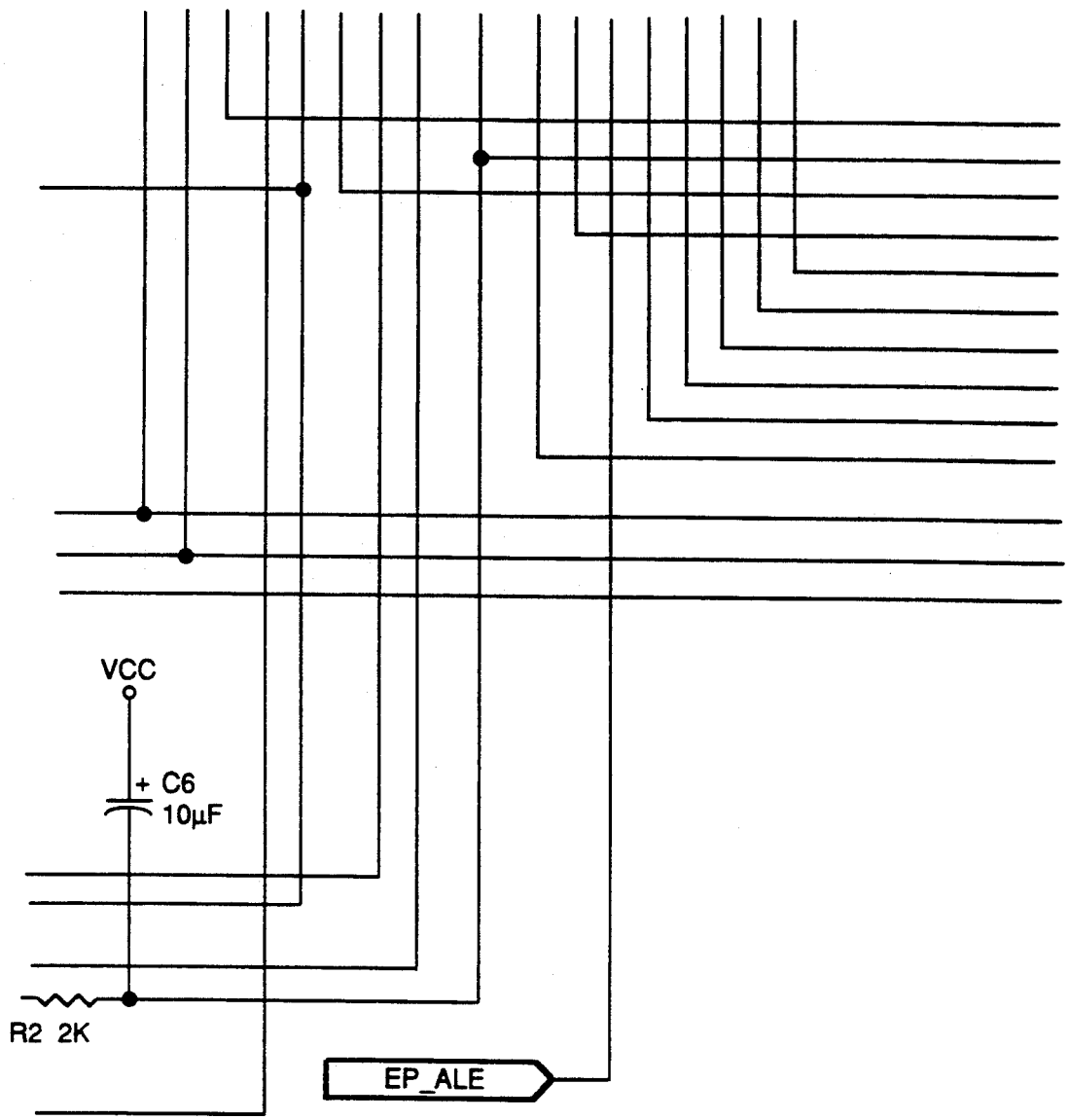
Figure 4F:
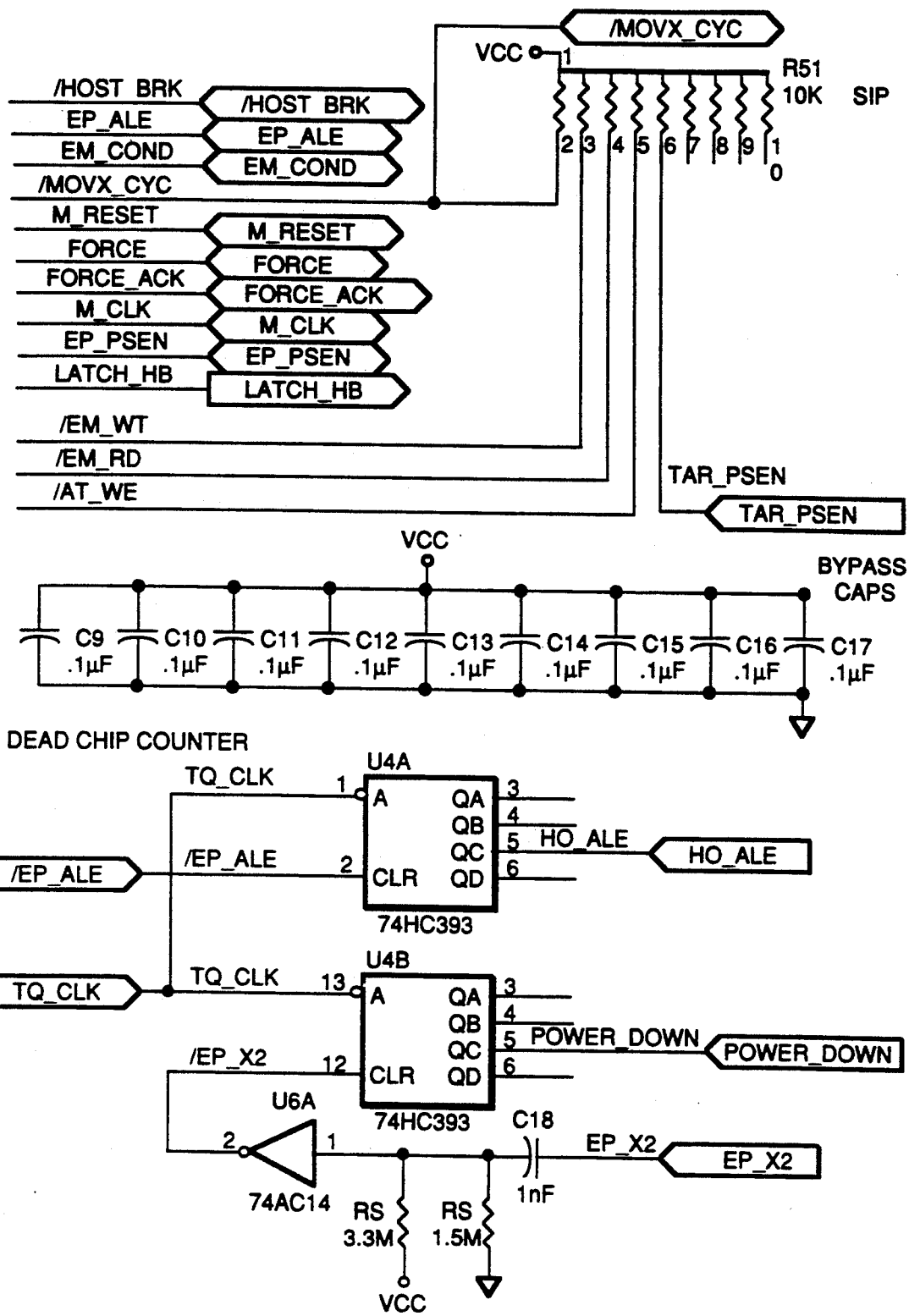
Figure 5A:
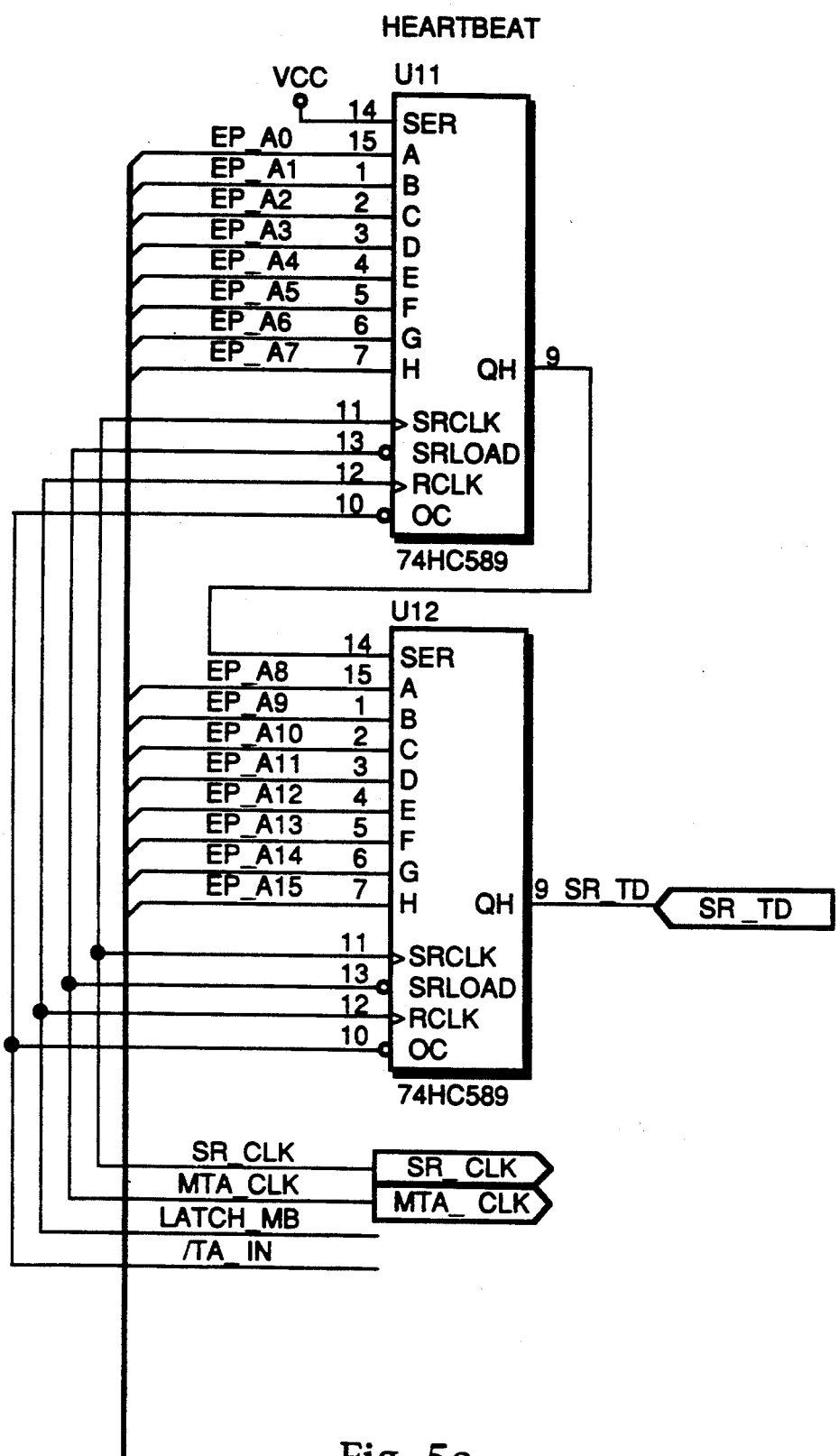
FIGS. 5a-5e are illustrative circuit schematics showing the emulation memory.
Figure 5B:
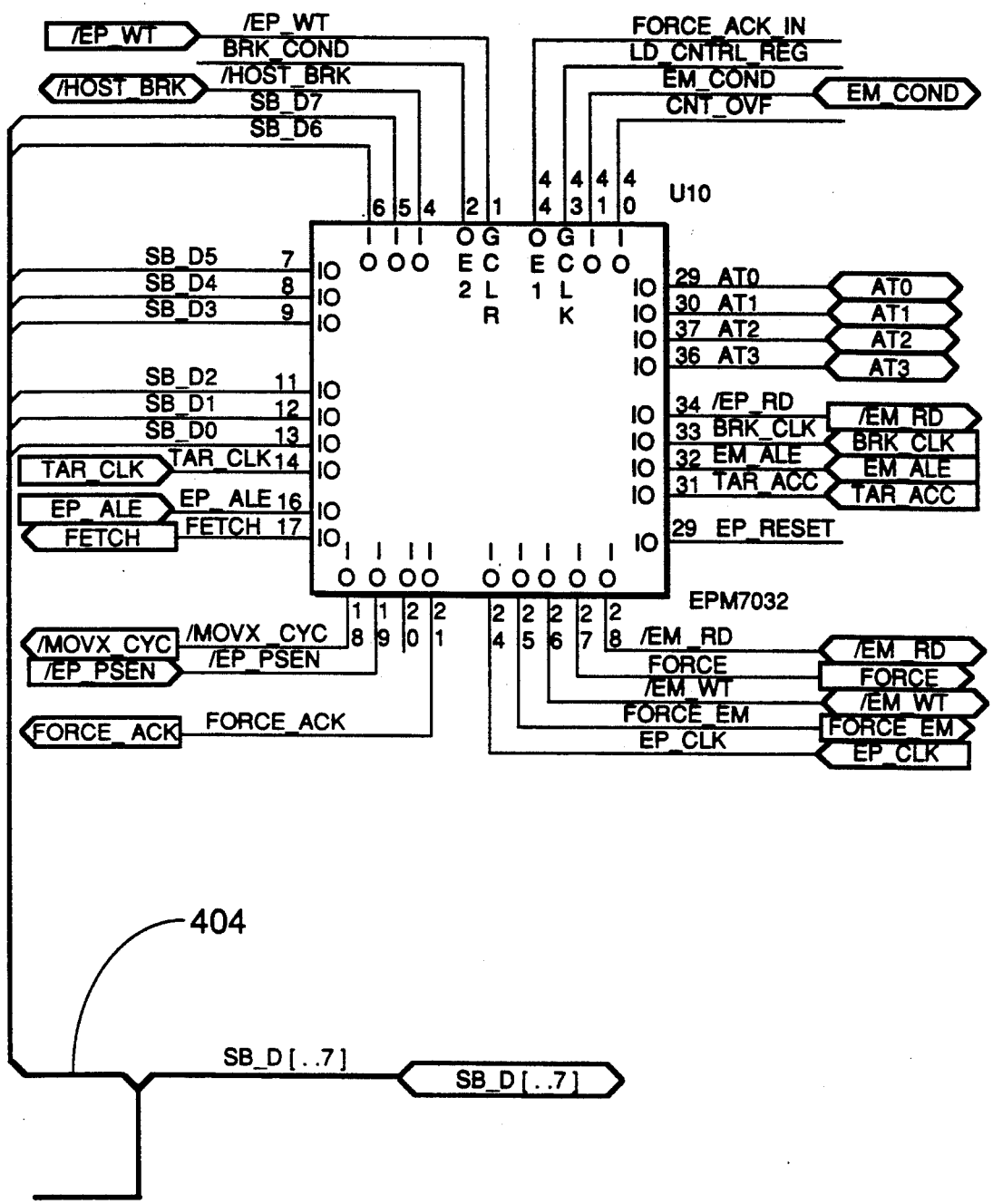
Figure 5C:
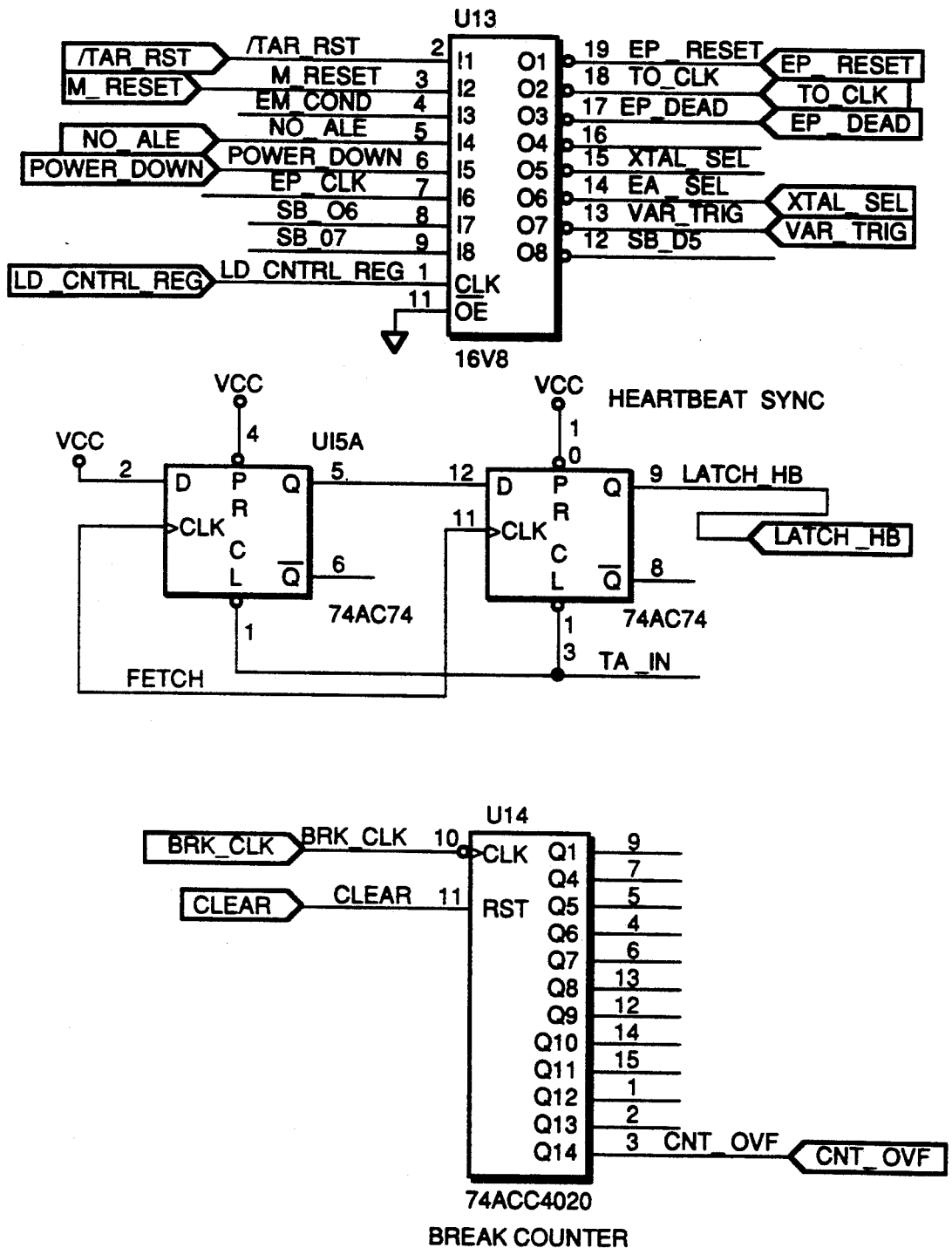
Figure 5D:
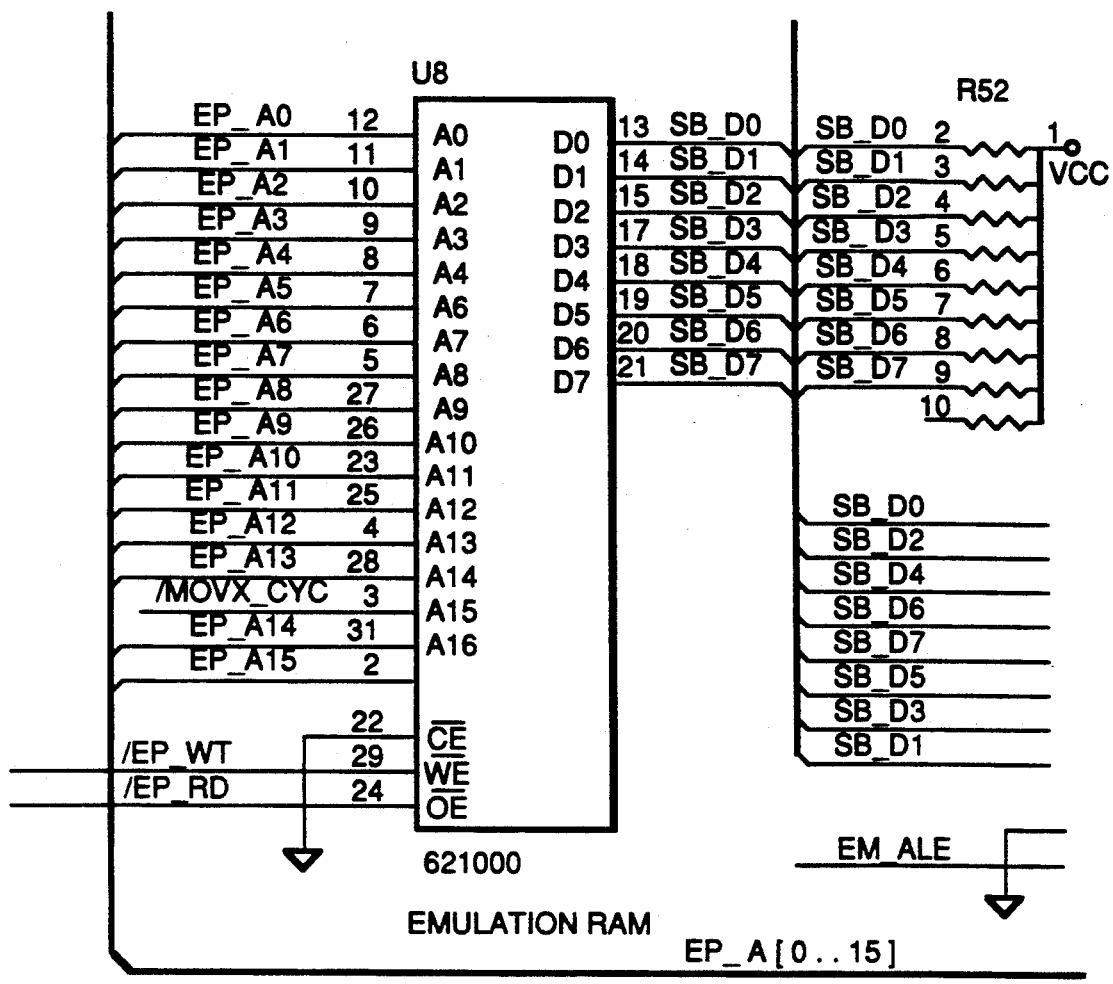
Figure 5D:
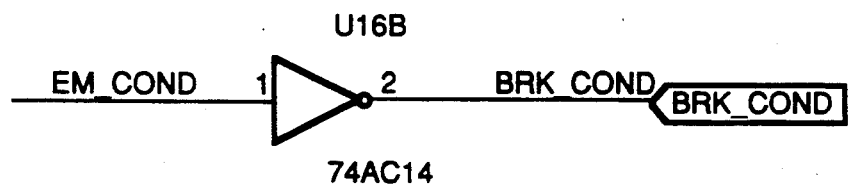
Figure 5E:
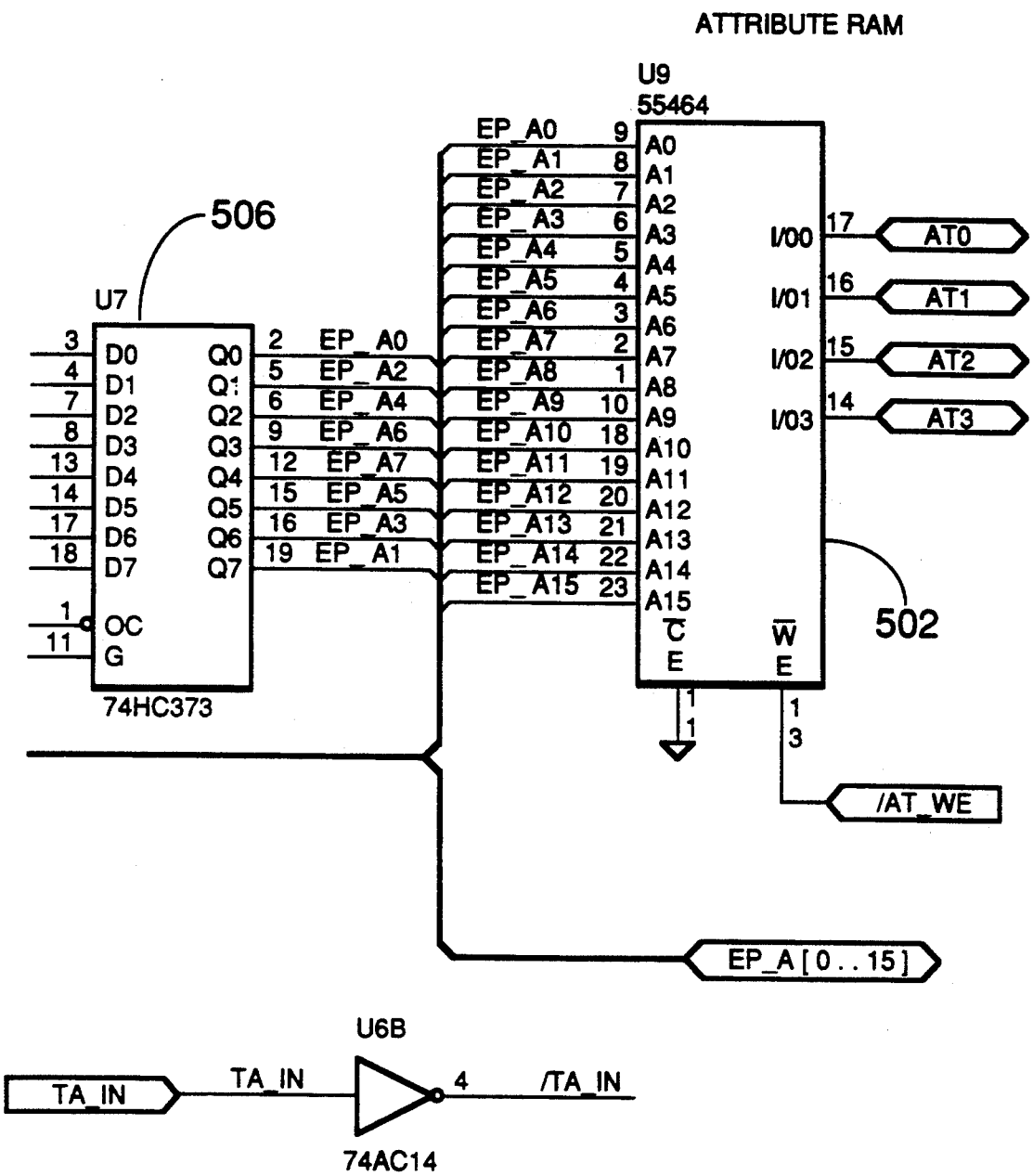

Referring to FIG. 2, a dual processor arrangement according to the present invention is described. The invention comprises a control processor 202, an oscillator 203, an emulation processor 204, an emulation memory 206, an address bus 208, a shared data bus 210, an address latch 212, a clock select multiplexer network 218, and a memory control signal multiplexer 220. In the preferred embodiment, clock select multiplexer network 218 comprises a multiplexer 214, and a multiplexer 215.

FIG. 2 also shows an address latch 260 having inputs coupled PORT0 of control processor 202, and having outputs coupled to a first portion of the address inputs of a control processor firmware memory 262. Control processor firmware memory 262 has a second portion of address inputs coupled to PORT2 of control processor 202, and a data bus port coupled to PORT0 of control processor 202.

In a typical implementation of the present invention, control processor 202 is an 80C451, emulation processor 204 is an 8032, emulation memory is a one megabit static RAM organized as 128K×8, and having seventeen address inputs and eight bidirectional data bus interface terminals (i.e., pins), and address latch 212 is a 74HC373 octal latch. Of course, emulation memory 206 could be organized differently without affecting the present invention. For example, it could have a wider data bus interface, more or fewer addressable locations, or separate data input and data output terminals which are coupled to shared bus 210. Similarly, address latch 212 could be implemented as a FIFO (with appropriate timing signals being provided as will be understood by those skilled in the art), or having a wider or narrower data bus interface.

Although the present invention is described in terms of emulation processor 204 being an 8032, the architecture of the present invention allows any 40-pin member of the 8051 family of microcontrollers to be used as emulation processor 204. In this way, a single emulator unit 200 may be used to provide in-circuit emulation for a large number of 8051 family members simply by replacing one chip. It is contemplated that emulation processor 204 is removably electrically-coupled to emulator 200 via a socket that permits easy insertion and removal of various members of the 8051 family, so that these chips may act as emulation processor 204.

PORT4 (shown as "P4" in FIG. 2) of control processor 202 is coupled directly to shared data bus 210. PORT4 is an I/O port that is under program control, in contrast to PORT0 and PORT2 (shown respectively as "P0" and "P2") which are active in fetching external instructions and data (in 8051 family devices). PORT0 of emulation processor 204 is coupled directly to shared data bus 210. The data inputs of address latch 212 are coupled directly to shared data bus 210. The outputs of address latch 212 are coupled directly to a first portion of address bus 208. PORT2 of emulation processor 204 is coupled directly to a second portion of address bus 208. PORT1 pin 6 (shown as "P1.6") of control processor 202 is used as one bit of the address to supplied to emulation memory 206. In this embodiment this signal is also referred to as MOVX_CYC.

As is well known in the art, both control processor 202 and emulation processor 204 require a clock signal input from which their respective internal timings are derived. Control processor 202 receives its clock input from oscillator 203. Typically, oscillator 203 is a crystal oscillator which produces an output signal of approximately 11.0592 MHz. Emulation processor 204 receives its clock input from a multiplexer network which is operable to provide any one of three clock sources as the clock input for emulation processor 204. A first one of these three clock sources is the target system clock. With this clock as its input, emulation processor 204 is synchronized to the target system. A second one of the three clock sources is the output of oscillator 203. A third one of the three sources is a signal that is synchronous with control processor 202, but having a frequency substantially less than the output of oscillator 203.

In particular, emulation processor 204 receives a clock signal which is the output of multiplexer circuit 215. Multiplexer 215 in conjunction with multiplexer 214 forms clock select multiplexer 218. Using this circuit configuration, emulation processor 204 is synchronized with the target system when in emulation mode, and synchronized with control processor 202 during a portion of the break mode. Actually, emulation processor 204 receives the target system clock even during break mode except for the period during which control processor 202 needs to do something. When processor 202 requires control of the emulator, it initiates switching of clock select multiplexer 218 such that control processor 202 controls the clocking of emulation processor 204. In this way control processor 202 can step emulation processor 204 to whatever cycle is appropriate for the action contemplated by control processor 202. For example if emulation processor 204 is an 8051 family member and control processor 202 needs to have emulation processor 204 put its PORT0 into a high impedance state, control processor 202 takes over clocking of emulation processor 204 and steps the emulation processor through its various bus cycles until it determines that PSEN has gone low. (As those skilled in the art will recognize, PSEN is the Program Store Enable signal of the 8051 family members, and PORT0 is in the tristate condition after PSEN goes low.)

A select signal, 216, of multiplexer 214 is provided to control its selection process. Selection signal 216 determines whether the target system clock or oscillator 203 may be provided as a clock input to emulation processor 204. A select signal 217 of multiplexer 215 is provided to control its selection process. Selection signal 217 determines whether the output of multiplexer 214 or the relatively low frequency clock controlled by control processor 202 is provided as the clock input to emulation processor 204.

Emulation memory 206 requires various control signals in order to distinguish between read and write operations. Since both control processor 202 and emulation processor 204 require read/write access to emulation memory 206, memory read/write control signals are required from both processors. Control signal multiplexer 220 has inputs coupled to the memory control signal outputs of both processors 202, 204. Control signal multiplexer 220 produces as an output the memory control signals from the processor which currently has access to memory 206. Control processor 202 determines which of the two processors 202, 204 should access memory 206. Control signal multiplexer 220 has a select signal input which is coupled to select signal 217, therefore its operation is essentially the same as that of multiplexer 215.

Specific Example

Referring to FIGS. 4-7, one embodiment of the present invention as an 8051 family emulator is shown in which an 80C451 microcontroller 402 is used as the control processor and an 8032 microcontroller 602 is used as the emulation processor. Both 80C451 microcontroller 402 and 8032 microcontroller 602 are manufactured by Signetics Corporation of Sunnyvale, Calif., and detailed electrical and functional information about them can be found in the Signetics publication "80C51 and Derivative Microcontrollers," (1992).

The shared bus of the present invention is designated by the reference numeral 404. Crystal oscillator 203 is implemented as shown by a crystal oscillator 406, which uses the internal oscillator circuit of the 80C451 microcontroller 402 shown in FIG. 4.

Referring to FIGS. 5a-5e, an emulation memory 502 is shown as a 128K byte static RAM having a data bus port coupled to shared bus 404. Emulation memory control signals 504 are shown coupled to emulation memory 502. An address latch 506 having inputs coupled to shared bus 404 and outputs coupled to the address inputs of emulation memory 502 is also shown.

Figure 6A:
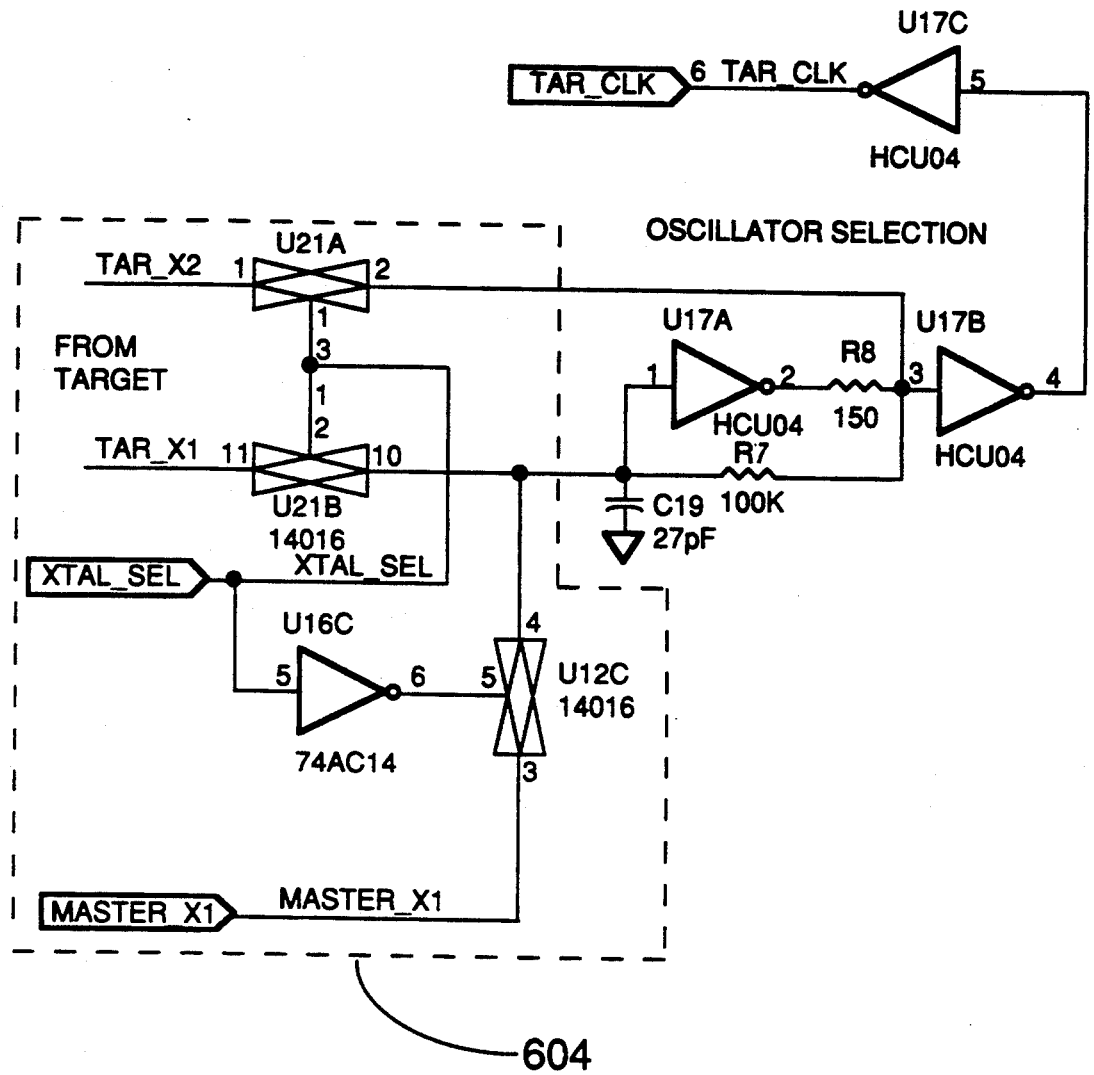
FIGS. 6a-6c are illustrative circuit schematics showing the emulation processor, oscillator selection circuit, and the target system interface.
Figure 6A:
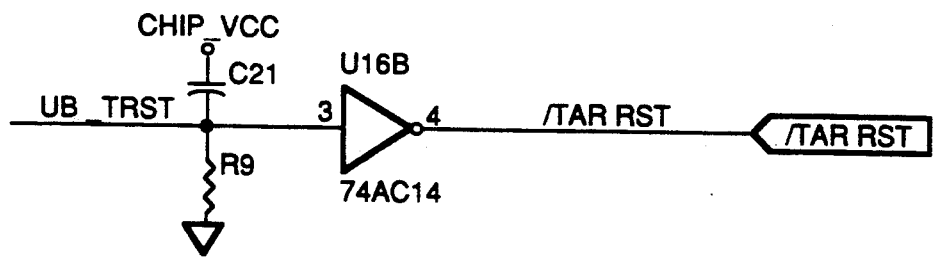
Figure 6B:
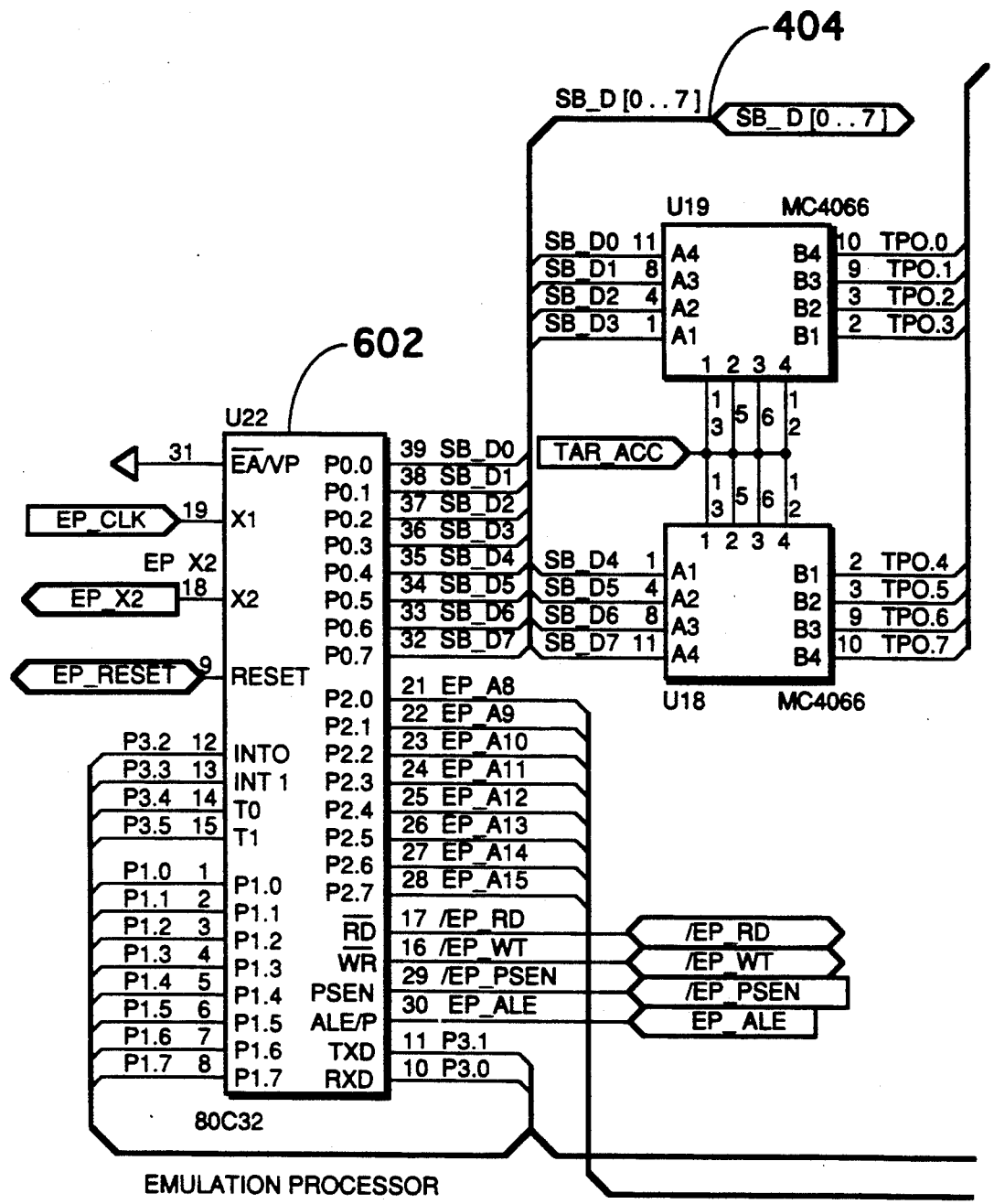
Figure 6C:
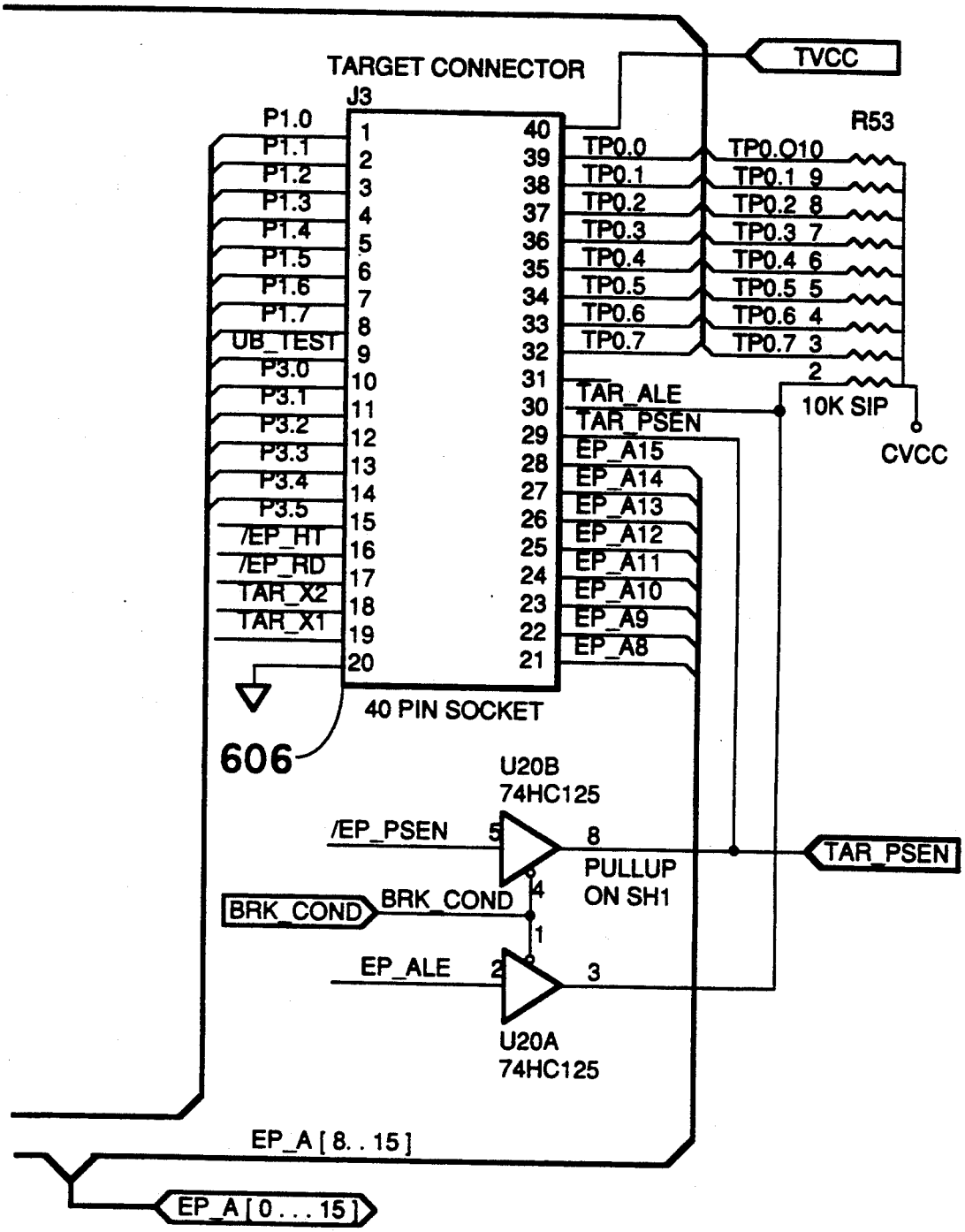
Figure 7B:
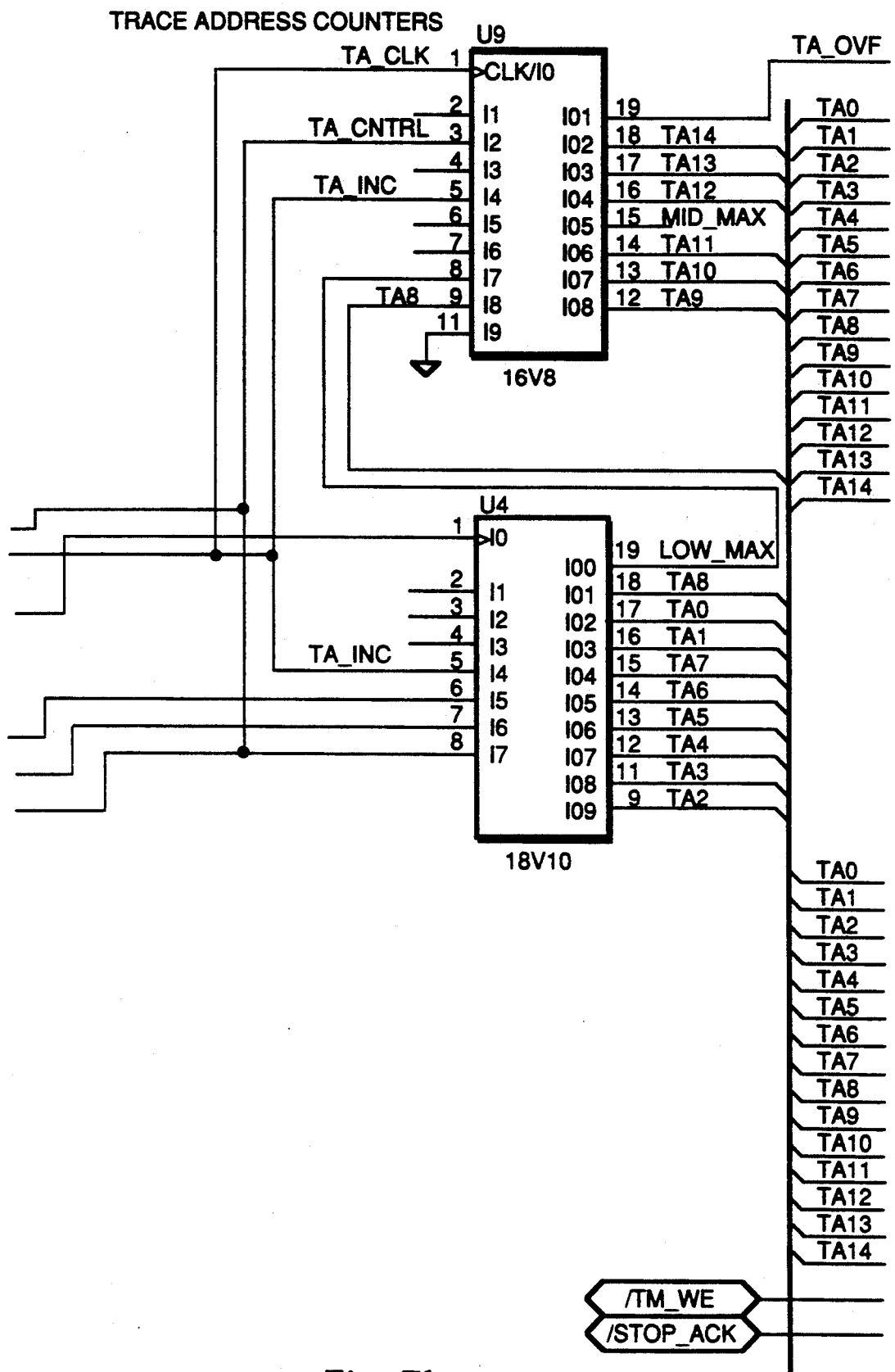
Figure 7C:
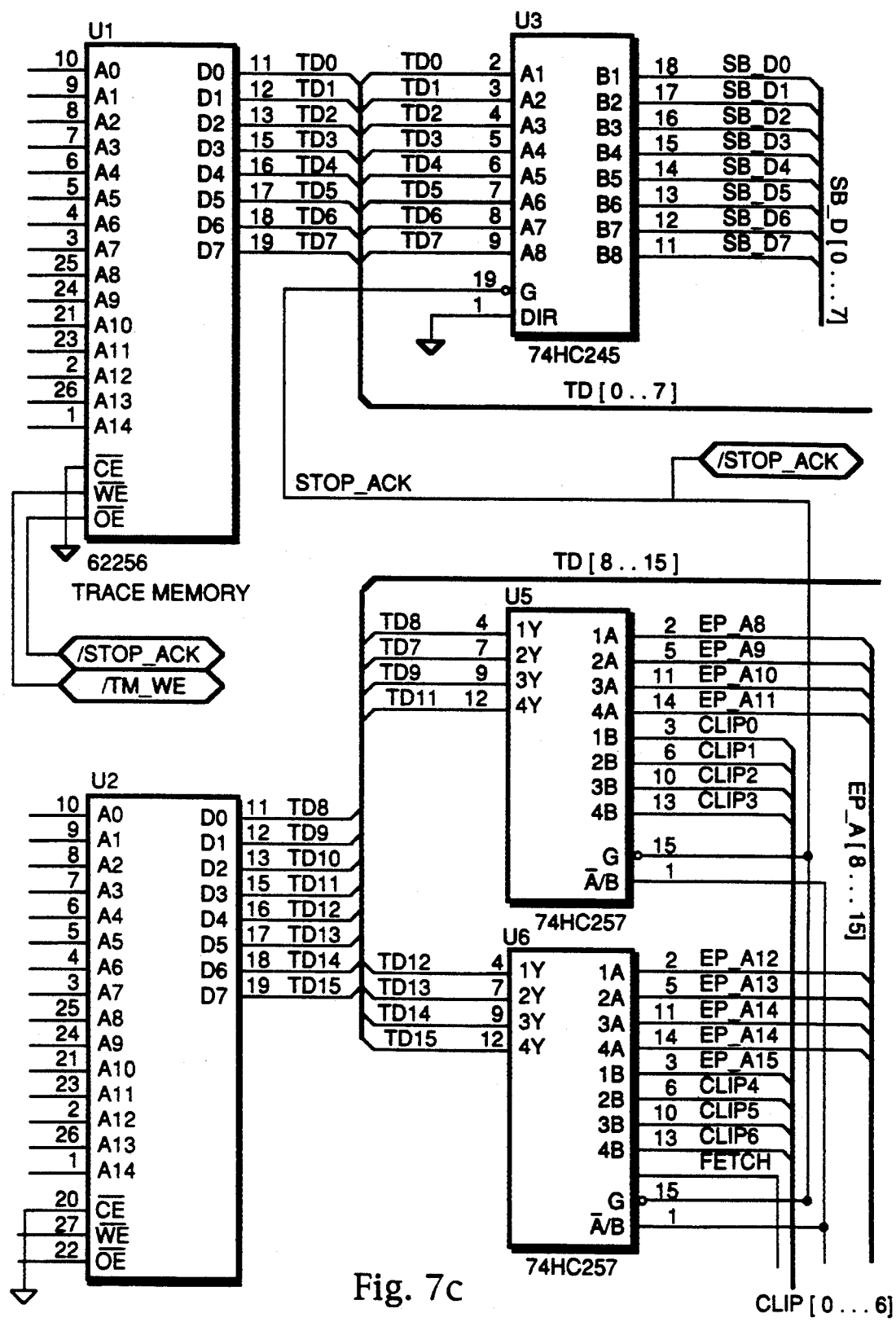
Figure 7D:
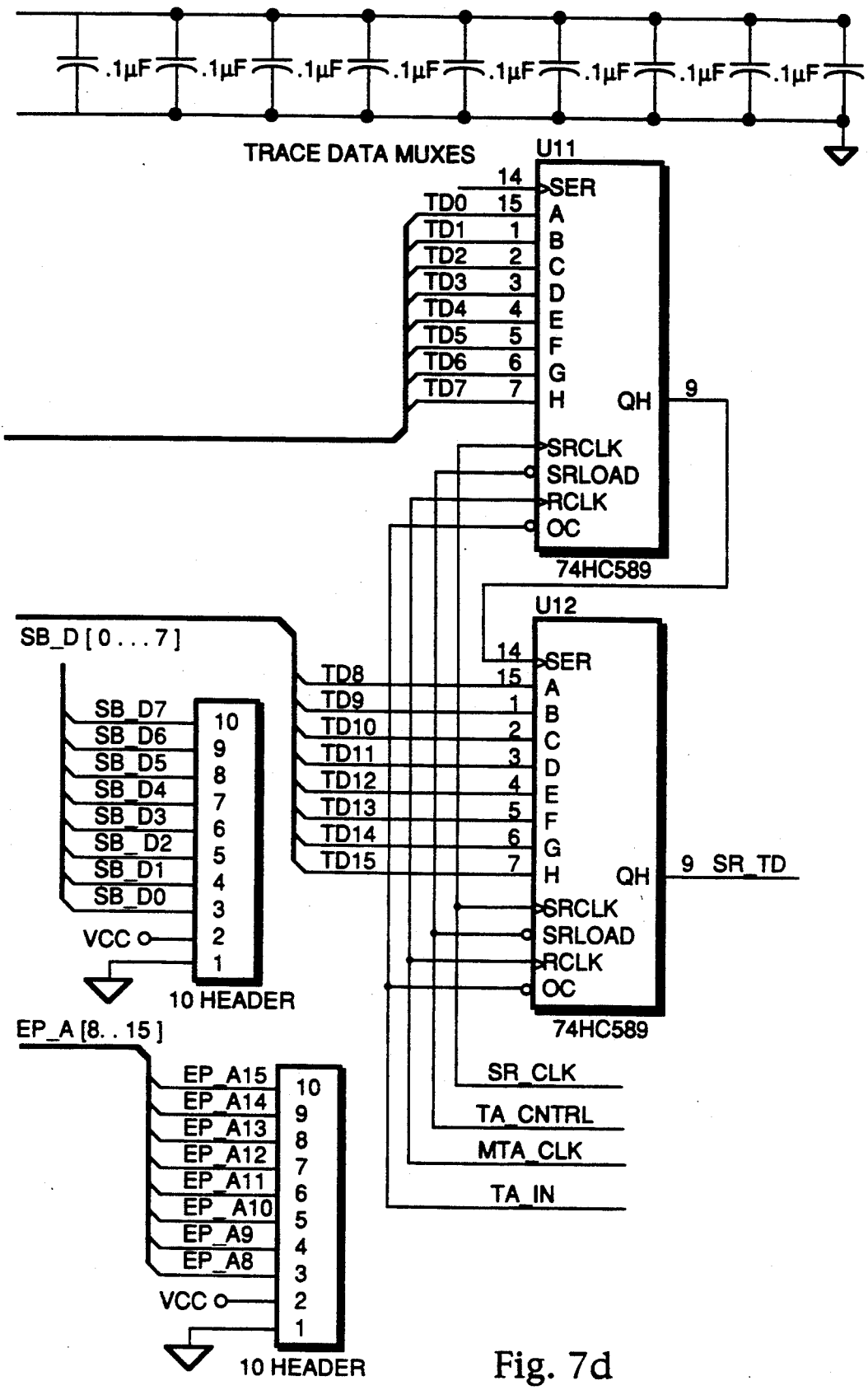
Figure 7E:
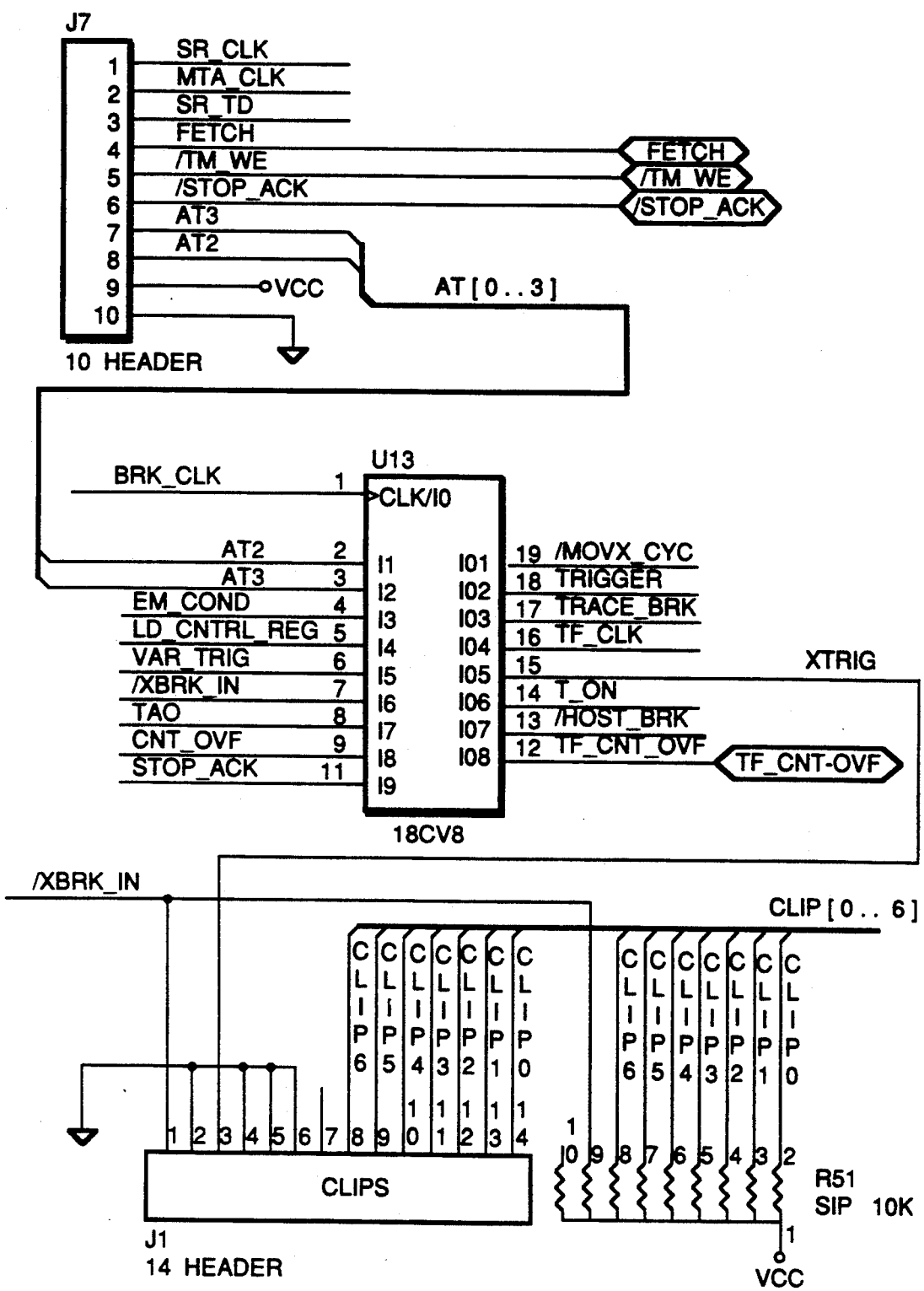

Referring to FIGS. 6a-6c, emulation processor 602 is shown directly coupled to shared bus 404. A circuit 604 for implementing clock signal source multiplexer 214 is shown, as is a 40-pin socket target connector 606. Connectors such as connector 606 are well understood in this field, and such connectors provide a means for connecting the emulator to the target system.

FIGS. 7a-7e show the circuitry used to implement the trace functions typically found in emulators. In the trace circuitry of the present invention, shared bus 404 is monitored for activity.

Figure 8A:
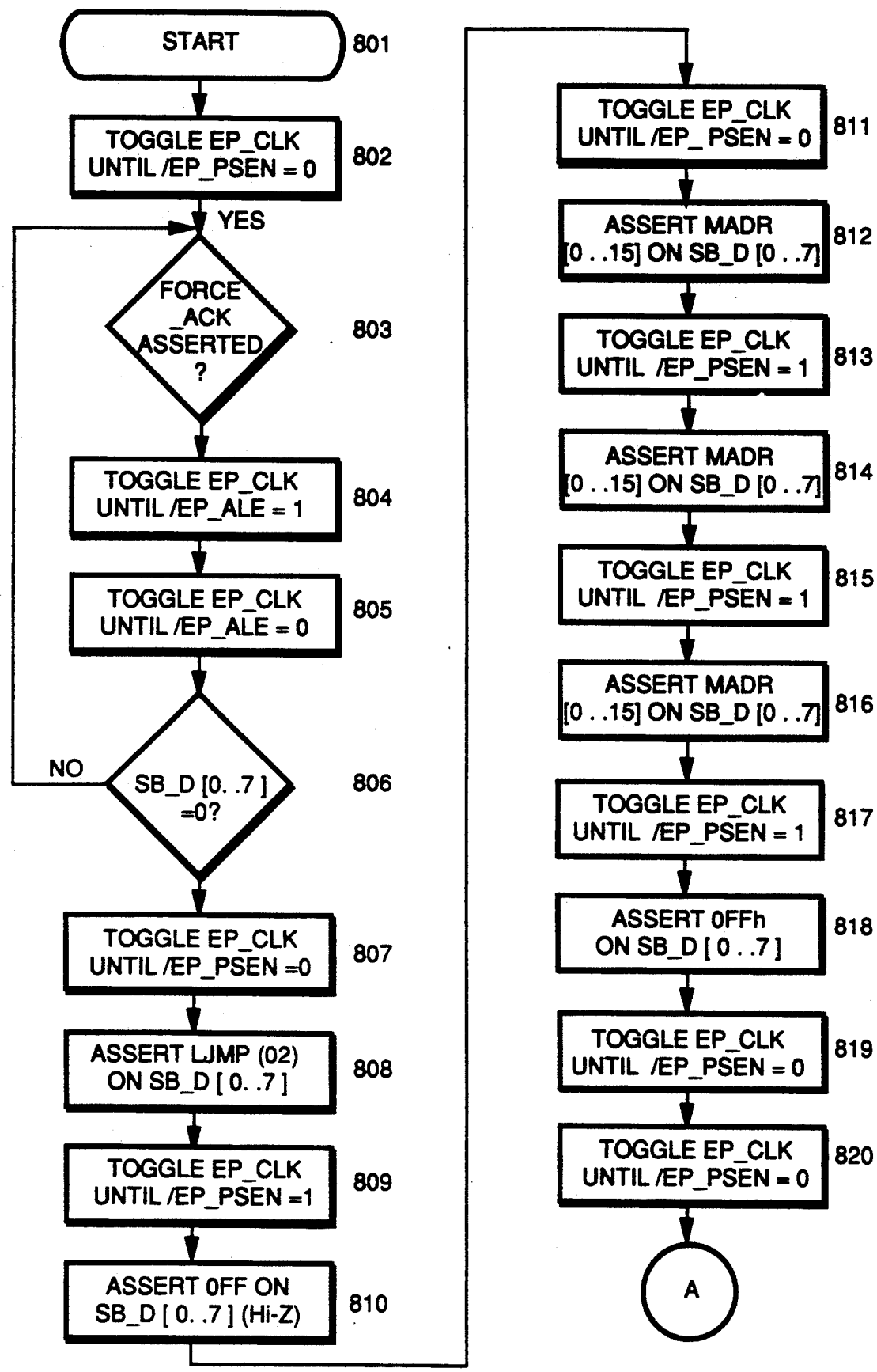
FIGS. 8A-8C show a flowchart of the steps taken by the control processor and emulation processor to operate together in a dual processor environment.
Figure 8B:
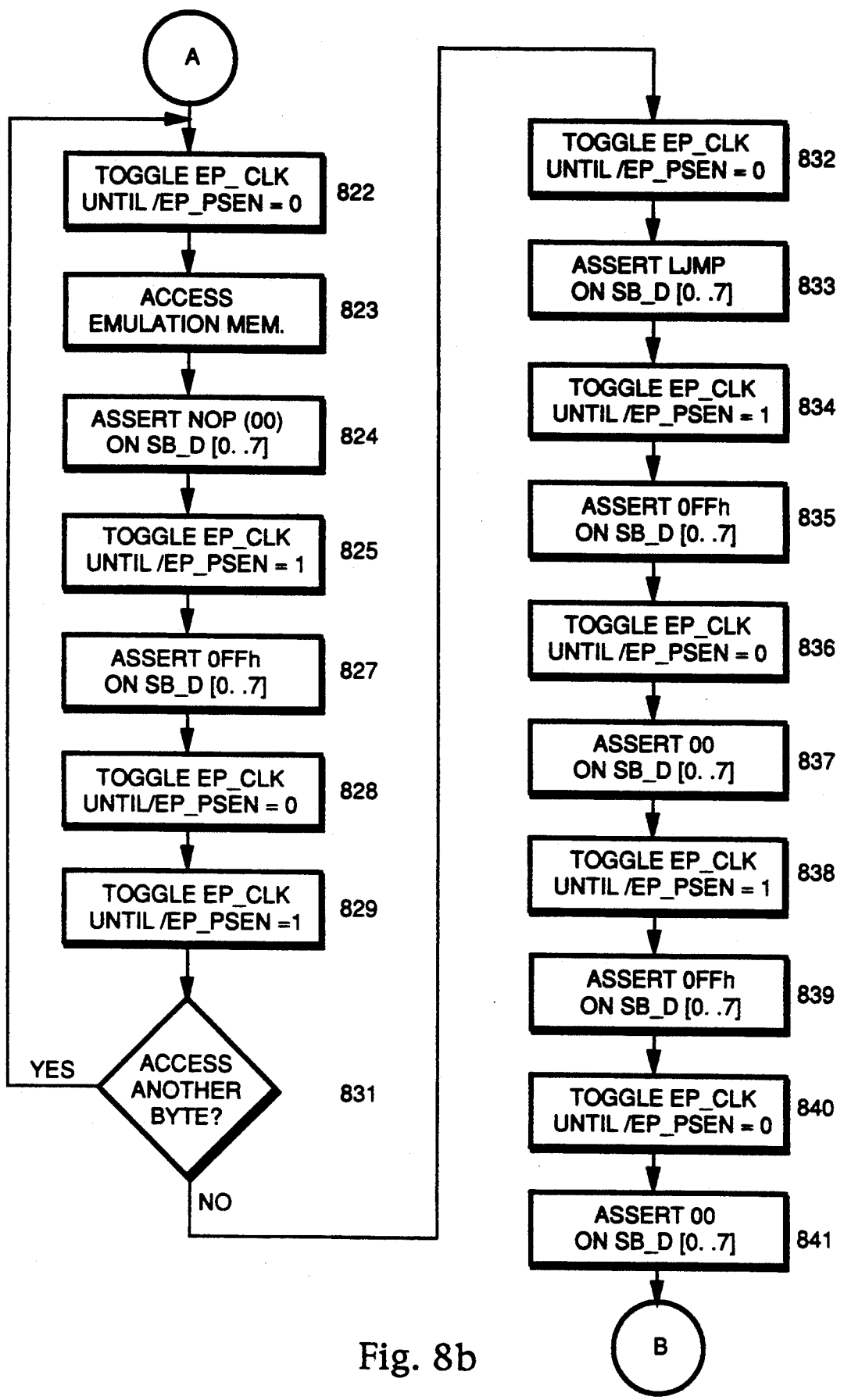
Figure 8C:
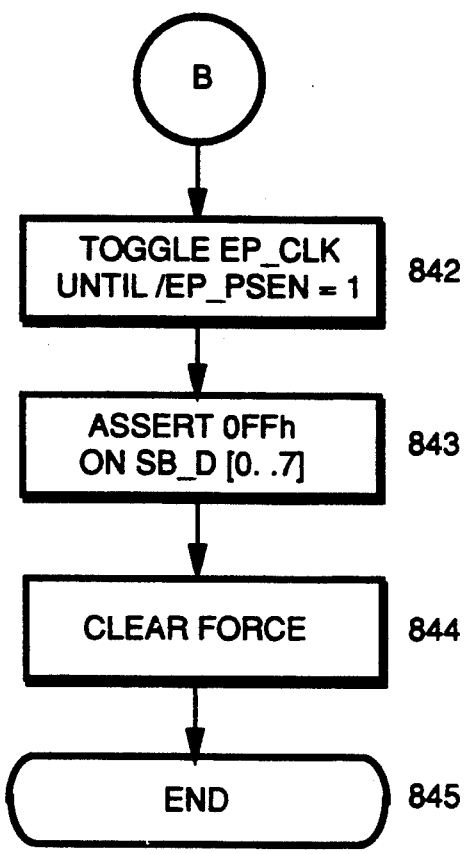
Figure 9A:
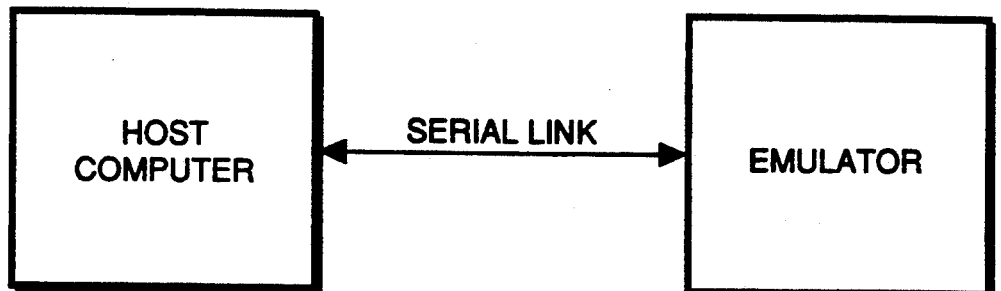
FIG. 9A is a block diagram illustrating the serial communication link between the host computer and the emulator.
Figure 9B:
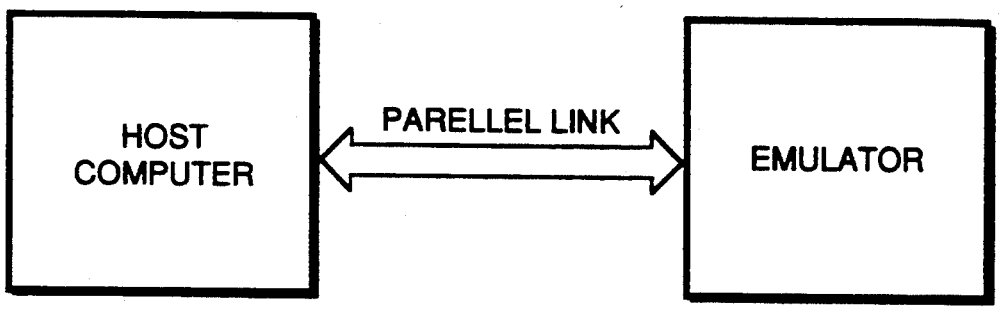
FIG. 9B is a block diagram illustrating the parallel communication link between the host computer and the emulator.
Figure 9C:
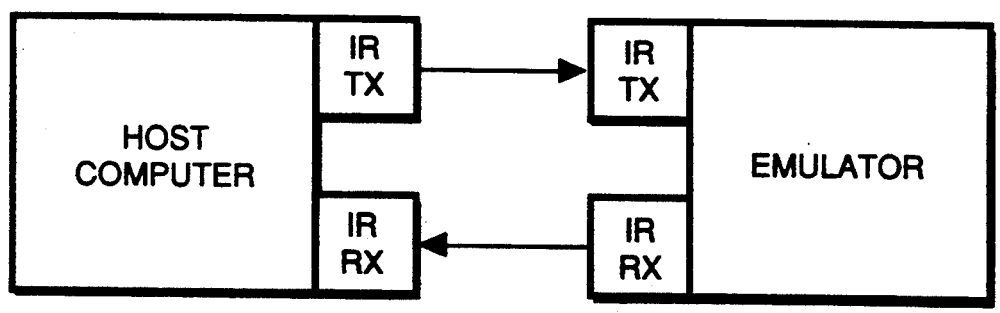
FIG. 9C is a block diagram illustrating the wireless infrared communication link between the host computer and the emulator.
Figure 9D:
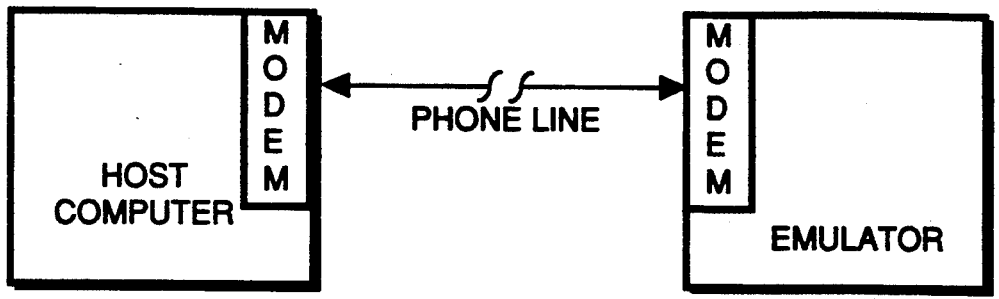
FIG. 9D is a block diagram illustrating the telephonic communication link between the host computer and the emulator.
Figure 9E:
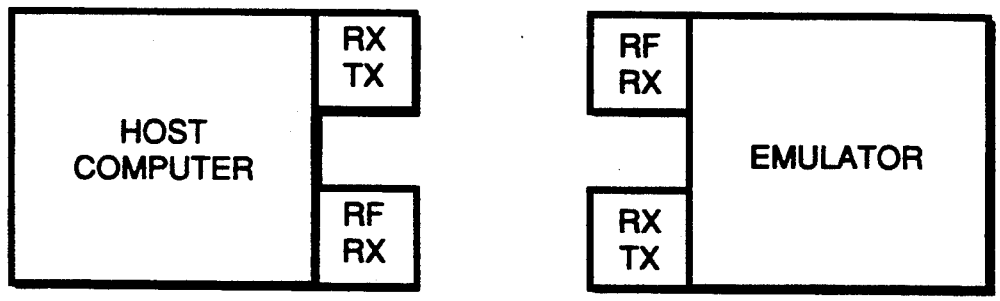
FIG. 9E is a block diagram illustrating the radio communication link between the host computer and the emulator.
Figure 9F:
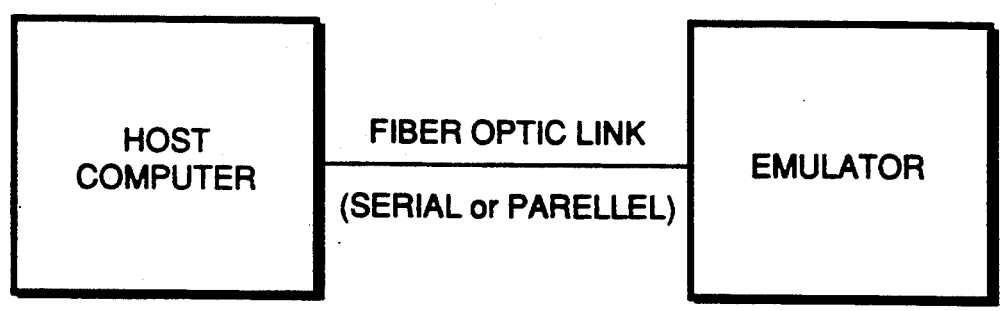
FIG. 9F is a block diagram illustrating the fiber optic communication link between the host computer and the emulator.

Emulation Processor as an Address Generator for all Accesses to Emulation Memory FIGS. 8A-8C show flowcharts of the method of the present invention wherein the control processor and the emulation processor operate cooperatively to perform synchronization tasks, as well as to obtain non-conflicting read/write access to the emulation memory. More particularly, FIGS. 8A-8C show the method by which the emulation processor is used as an address generator for all accesses to emulation memory by the control processor. This method is applicable to all memories that are connected to the address bus of the emulation processor. The control processor is required, in the architecture of the present invention, to have access to the emulation memory in order to upload/download the emulation memory data from/to the host computer.

The flowcharts of FIGS. 8A-8C describe the transitions of various signals under the control of the control processor and the emulation processor. These signals are shown in the circuit diagrams of FIGS. 4-7.

The method of the present invention has five major portions, alternatively referred to as operations. The first major operation is to get the clock signal source of the emulation processor clock (EP_CLK) to be synchronously switched from a free running clock (TAR_CLK) to an I/O pin of the control processor, wherein the I/O pin is directly coupled to EP_CLK. This is accomplished via steps 802-803.

The second major operation is to get the emulation processor to an instruction fetch bus cycle so that the control processor can start forcing instructions for the emulation processor to execute. This is accomplished via steps 804-806.

The third major operation is to get the emulation processor to output the address of the memory location that the control processor wants to access. This is accomplished via steps 807-820.

The fourth major operation is the access of the emulation memory by the control processor. This is accomplished via steps 822-831.

The fifth major operation is to return the emulation processor to the state where it is executing a wait loop using TAR_CLCK as the clock signal source for EP_CLK. This is accomplished via steps 832-844.

Detailed Discussion of Method

Step 801: At this point the emulation processor's EP_CLK source is TAR_CLK. The emulation processor is executing an Absolute Jump (AJMP 00; hex value 01 00) instruction that was previously placed by the control processor at emulation memory locations 0000 and 0001. This instruction is effectively a jump to itself. The user's data that should reside at emulation memory locations 0000 and 0001 are stored in the control processor's internal memory and is restored before every emulation cycle.

To start this routine, the host computer has requested of the control processor to either read or write some amount of the emulation memory data. The control processor first makes sure that the request does not include emulation memory locations 0000 and 0001, in which case the control processor simply updates its internal image of those two locations. If the memory access request from the host computer is neither of those two locations, the control processor will proceed with the following operations.

Step 802: The control processor asserts FORCE. This signal has the effect switching the source of the EP_CLK from TAR_CLK to the control of a control processor I/O pin. This switching is done synchronously with respect to TAR_CLK. FORCE also tri-states the emulation memory control signals /EM_WT and /EM_RD.

Step 803: The control processor samples the signal FORCE_ACK. Assertion of FORCE_ACK tells the control processor that the clock switching and signal tri-stating requested by the assertion of FORCE is done. This signal is needed since the clock switching is done synchronously with respect to TAR_CLK, which may be operating at a frequency well below the speed of the control processor. If FORCE_ACK is not asserted, the control processor continues to sample FORCE_ACK until it becomes asserted. Once FORCE_ACK is asserted, the control processor knows it can clock the emulation processor.

Step 804: The control processor forces EP_CLK low and then forces EP_CLK high (this action is called toggling EP_CLK). It then samples the EP_ALE signal to see if it is high. If it is not high, it continues to toggle EP_CLK until EP_ALE goes high. With EP_ALE high, the control processor now knows that the emulation processor is at the beginning of a bus cycle.

Step 805: The control processor toggles EP_CLK and samples EP_ALE to see if it is low. If it is not low, it continues to toggle EP_CLK until EP_ALE goes low.

Step 806: When EP_ALE goes low from a previous high state, the emulation processor is asserting the low byte of the memory address on the shared bus (SB_D[0 . . . 7]). The control processor reads the address value from its SB_D[0 . . . 7] port and compares it to 00. The value read by the control processor is 00 only when the emulation processor has executed the AJMP 00 instruction and has jumped back to 00 and is ready to fetch the next instruction. Thus an address of 00 indicates to the control processor that the emulation processor is at the beginning of an instruction cycle. If the address is not 00, the control processor goes back to Step 804 to get the address of the next bus cycle.

Step 807: The control processor toggles EP_CLK and samples /EP_PSEN to see if it is low. If it is not low, it continues to toggle EP_CLK until /EP_PSEN goes low.

Step 808: With /EP_PSEN low, the control processor knows that the emulation processor has tri-stated its low byte address drivers and is ready to input data. The control processor forces a Long Jump (LJMP-hex 02) instruction opcode onto the SB_D[0 . . . 7] bus.

Step 809: The control processor toggles EP_CLK and samples /EP_PSEN to see if it is high. If it is not high, it continues to toggle EP_CLK until /EP_PSEN goes high.

Step 810: With /EP_PSEN high, the control processor knows that the emulation processor has read in the data that it put on the SB_D[0 . . . 7] bus. The control processor then writes OFFH to its SB_[0 . . . 7] port which has the effect of putting the port into a high impedance state so the emulation processor can drive out the address of the next bus cycle without conflict.

Step 811: Same as step 807.

Step 812: With /EP_PSEN low, the control processor knows that the emulation processor has tri-stated its low byte address drivers and is ready to input data. The control processor forces the high byte of the target address, which is the second byte of the Long Jump instruction, onto bus SB_D[0 . . . 7]. In this case the target address is the address requested by the host for the memory access.

Step 813: Same as step 809.
Step 814: Same as step 810.
Step 815: Same as step 807.

Step 816: With /EP_PSEN low, the control processor knows that the emulation processor has tri-stated its low byte address drivers and is ready to input data. The control processor forces the low byte of the target address, which is the third byte of the Long Jump instruction, onto the SB_D[0 . . . 7] bus.

Step 817: Same as step 809.
Step 818: Same as step 810.
Step 819: Same as step 807.

Step 820: Same as step 809. Since the last bus cycle of a Long Jump instruction is a dummy cycle, no data needs to be asserted on bus SB_D[0 . . . 7] for the emulation processor to input. The next address that the emulation processor will output will be the target address of the Long Jump instruction, which in this case is the address of the memory location that the host wants the control processor to access.

Step 822: Same as step 807.

Step 823: If it is a read access, the control processor asserts /EM_RD, reads the emulation memory data from its SB_D[0 . . . 7] port, deasserts /EM_RD and uploads the data to the host. If it is a write access, the control processor asserts /EM_WT, outputs the write data from the host onto its SB_D[0 . . . 7] port and deasserts /EM_WT which writes the data onto the emulation memory.

Step 824: The control processor outputs a No Operation (NOP-hex 00) instruction on its SB_D[0 . . . 7] port for the emulation processor to execute. The execution of this instruction by the emulation processor has the effect of generating the next sequential address of the emulation memory.

Step 825: Same as step 809.
Step 826: Same as step 810.
Step 827: Same as step 807.

Step 829: Same as step 809. Since the last bus cycle of a No Operation instruction is a dummy cycle, no data needs to be asserted on SB_D[0 . . . 7] for the emulation processor to input.

Step 831: If the control processor needs to access the next sequential address, it will jump back to Step 822.

Step 832: Same as step 807.

Step 833: The control processor forces a Long Jump (LJMP, hex 02) instruction opcode onto bus SB_D[0 . . . 7].

Step 834: Same as step 809.
Step 835: Same as step 810.
Step 836: Same as step 807.

Step 837: The control processor outputs 00 as the high byte of the LJMP target address onto bus SB_D[0 . . . 7].

Step 838: Same as step 809.
Step 839: Same as step 810.
Step 840: Same as step 807.

Step 841: The control processor outputs 00 as the low byte of the LJMP target address onto bus SB_D[0 . . . 7].

Step 842: Same as step 809.
Step 843: Same as step 810.

Step 844: The emulation processor is set up to jump to location 0000 where the AJMP 00 (i.e., jump on self) code resides. The control processor clears FORCE, which will switch the source of the EP_CLK back to the TAR_CLK and the emulation processor will do the final dummy bus cycle of the LJMP and effect a jump to location 0000 and continue executing the AJMP 0000.

Although the present invention has been described in terms of the presently preferred embodiments, it is to be understood that the disclosure is not to be interpreted as limiting. For example, the architecture of the present invention is applicable to any in-circuit emulator for a microcontroller having a multiplexed address/data bus. It is also contemplated that the present invention can be used in conjunction with in-circuit emulators for general purpose microprocessors and for Digital Signal Processors (DSPs) where these devices have multiplexed address data busses and I/O ports. Various other alterations and modifications will no doubt become apparent to those skilled in the art after having read the above disclosure. Accordingly, it is intended that the subjoined claims be interpreted as covering all alterations and modifications as fall within the true spirit and scope of the invention.

What is claimed is:

1. An in-circuit emulator system architecture comprising:
   a) a first programmed data processor having a plurality of I/O ports and a second programmed data processor having a multiplexed address/data bus port, wherein a predetermined number of I/O ports of said first programmed data processor are directly coupled to a first data bus and said multiplexed address/data bus port of said second programmed data processor is directly coupled to said first data bus;
   b) a memory having a plurality of address inputs and a plurality of data bus interface terminals, and at least one control signal input, said data bus interface terminals coupled to said first bus;
   c) a first multiplexer network having an output, coupled to said second programmed data processor, and a plurality of input terminals for receiving a plurality of clock signals, wherein at least a first one of said plurality of clock signals originates from a target system;
   d) a second multiplexer network having at least one output, coupled to said at least one memory control signal input, and a plurality of input terminals for receiving a first plurality of memory control signals from said first programmed data processor, a second plurality of memory control signals from said second programmed data processor, and at least one select control signal from said first programmed data processor;
   e) a means for storing information having a plurality of inputs coupled to said first bus, and a plurality of outputs coupled to at least a portion of said plurality of memory address inputs; and
   f) an oscillator for providing a clock input signal for at least said first programmed data processor and said first multiplexer network;
   wherein said second programmed data processor receives an instruction stream from said memory, and at least one input of said first multiplexer network is directly coupled to at least one of said plurality of I/O ports of said first programmed data processor such that when said at least one input is selected as an output of said first multiplexer network, said second programmed data processor receives a clock signal as an input, said clock signal having timing characteristics determined by instructions executed by said first programmed data processor.

2. The in-circuit emulator system architecture of claim 1 wherein said means for storing information has the same number of inputs coupled to said first bus as it has outputs coupled to said memory address inputs.

3. The in-circuit emulator system architecture of claim 2 wherein said first multiplexer network comprises a three-to-one multiplexer.

4. The in-circuit emulator system architecture of claim 3 wherein said three-to-one multiplexer comprises a cascaded pair of two-to-one multiplexers.

5. The in-circuit emulator system architecture of claim 3 wherein said means for storing information is a latch having a width equal to the width of said first bus.

6. An in-circuit emulator system comprising:
   a) an emulation processor having a clock input, a multiplexed bidirectional address/data bus port, an address bus output port coupled to an address bus, and two memory control signal output terminals;
   b) a control processor having a clock input, a multiplexed bidirectional address/data bus port, an address bus output port and a plurality of input/output port terminals;
   c) an emulation memory having address inputs coupled to said address bus, and data terminals coupled to a data bus;
   d) an emulation memory control signal multiplexer having four input terminals for receiving memory control signals, and having two outputs, coupled to said emulation memory, for providing a selected two of said four inputs to said emulation memory, wherein a first set of two input terminals of said four input terminals is coupled to said emulation processor, and a second set of two input terminals is coupled to said input/output port terminals of said control processor;
   e) an address latch having a plurality of input terminals and a plurality of output terminals, said input terminals directly coupled to one of said plurality of control processor input/output ports and directly coupled to said emulation processor address/data bus port, and operable such that said address latch receives and stores a portion of an address from either of said control and emulation processors, and wherein said address bus is coupled to said address latch output terminals;
   f) a plurality of clock signal sources;
   g) a clock select multiplexer network operable to receive a plurality of clock signals and provides as an output a selected one of said plurality of clock signals, said clock select multiplexer network having inputs coupled to said plurality of clock signal sources, and an output coupled to said emulation processor clock input; and
   h) a firmware memory that stores programs, said programs being accessible by said control processor, and said programs further being inaccessible to said emulation processor;
   wherein said control processor address/data bus port is coupled to said firmware memory, and said control processor address bus port is coupled to said firmware memory.

7. The microcontroller emulator system of claim 6 further comprising:
   an emulator system communication interface; and
   a host computer having a communication interface coupled to said emulator system communication interface for communication between said host computer and said microcontroller emulator system.

8. The microcontroller emulator system of claim 7 wherein said host computer communication interface is a serial communication interface, and said emulator system communication interface is a serial interface.

9. The microcontroller emulator system of claim 7 wherein said host computer communication interface is a parallel communication interface, and said emulator system communication interface is a parallel interface.

10. The microcontroller emulator system of claim 7 wherein said host computer communication interface is a wireless infrared transceiver, and said emulator system communication interface is a wireless infrared transceiver.

11. The microcontroller emulator system of claim 7 wherein said host computer and said emulator system are located at physically remote sites and said host computer communication interface is a modem, and said emulator system communication interface is a modem.

12. The microcontroller emulator system of claim 7 wherein said host computer communication interface is a radio frequency transceiver, and said emulator system communication interface is a radio frequency transceiver.

13. The microcontroller emulator system of claim 7 wherein said host computer communication interface is a fiber optic communication interface, and said emulator system communication interface is a fiber optic interface.

14. The microcontroller emulator system of claim 6 wherein said emulation memory data terminals comprise at least one input terminal and at least one output terminal.

15. The microcontroller emulator system of claim 6 wherein said emulation memory data terminals are bidirectional input/output terminals.

16. The microcontroller emulator system of claim 6 wherein said control processor and said emulation processor each are capable of executing the 8051 instruction set.

17. The microcontroller emulator system of claim 6 wherein said control processor is an 80C451 and said emulation processor is an 8032.

18. The microcontroller emulator system of claim 6 wherein said emulation memory is a single chip one megabit static RAM organized as 128K×8.

19. The microcontroller emulator system of claim 6 wherein at least one of said clock signal sources is a crystal oscillator.

20. The microcontroller emulator system of claim 19 wherein said crystal oscillator provides a periodic output signal having a frequency of approximately 11.0592 MHz.

21. A shared bus in-circuit emulator comprising:
 a) a master microcontroller having a first I/O port operable as a multiplexed address/data port, a second I/O port operable to output a portion of an address and a third I/O port coupled to a shared bus;
 b) an emulation processor having a first I/O port operable as a multiplexed address/data port coupled to said shared bus, a second I/O port operable to output a portion of an address, said second I/O port of said emulation processor coupled to an address bus, and a clock input terminal;
 c) an emulation memory having address inputs coupled to said address bus;
 d) a first latch, having a plurality of data inputs and a plurality of data outputs, wherein said data outputs are coupled to a first portion of said address bus, and said inputs are coupled to said shared bus;
 e) a clock source select circuit having an output coupled to said emulation processor clock input terminal and said clock source select circuit having a select control input coupled to said fourth I/O port of said master microcontroller;
 f) a firmware memory having at least one output terminal coupled to said first I/O port of said master microcontroller, and further having at least one address input terminal coupled to said second I/O port of said master microcontroller; and
 g) a second latch having at least one data input and at least one data output, said inputs coupled to said first I/O port of said master microcontroller, and said outputs coupled to said address input terminals of said firmware memory.

22. The shared bus emulator of claim 21 wherein said emulation processor may be any one of the 40-pin members of the 8051 family of microcontrollers.

23. A method of operating an in-circuit emulator having a control processor and an emulation processor wherein said emulation processor has a multiplexed address/data bus port and said control processor has an I/O port operable under program control, comprising the steps of:
 a) selecting and applying a first clock signal source to said emulation processor;
 b) executing a first set of instructions within said emulation processor;
 c) executing a second set of instructions within said control processor;
 d) selecting and applying a second clock signal source to said emulation processor wherein said second clock signal is synchronized with said control processor.
 e) monitoring a first output signal from said emulation processor.
 f) stopping said second clock signal source to said emulation processor when said first output signal transitions from a logical one to a logical zero so that said multiplexed address/data bus port of said emulation processor is in a tri-state condition; and
 g) accessing said data bus by said control processor while said multiplexed address/data bus port of said emulation processor is in a tri-state condition.

24. The method of claim 23 wherein said emulation processor is an 8051 family member.

25. The method of claim 24 wherein said control processor is an 8051 family member.

26. The method of claim 25 wherein said output signal is a PSEN output signal.

27. A method of operating an in-circuit emulator comprising the steps of:
 a) providing a control processor having at least one I/O port, an emulation processor having a multiplexed address/data bus port, and an emulation memory:
 b) switching a clock signal input of said emulation processor from a free running clock to an I/O pin of said control processor, said switching being a synchronous switching;
 c) clocking said emulation processor until said emulation processor enters an instruction fetch bus cycle state;
 d) outputting an address from said emulation processor, said address being determined by said control processor;
 e) accessing said emulation memory by said control processor; and
 f) returning said emulation processor to a state where it is executing a wait loop.

28. The method of claim 27 wherein said step (a) comprises the steps of asserting a FORCE signal, and sampling a FORCE_ACK signal to determine if said switching has been completed.

29. The method of claim 27 wherein said step (b) comprises the steps of toggling said clock signal source until an EP_ALE signal of said emulation processor is high, toggling said clock signal source until said EP_ALE signal is low, and detecting predetermined address.

30. The method of claim 27 wherein said step (c) comprises the steps of toggling said clock signal source until an /EP_PSEN signal goes low and forcing a Long Jump instruction opcode onto said multiplexed address/data bus port.

31. The method of claim 27 wherein said step (d) comprises the steps of uploading data from said emulation memory to a host computer if the host computer has requested a read cycle, and downloading data from said host computer to said emulation memory if the host computer has requested a write cycle.

* * * * *